(12) United States Patent
Bobotek

(10) Patent No.: US 8,924,488 B2
(45) Date of Patent: Dec. 30, 2014

(54) EMPLOYING REPORT RATIOS FOR INTELLIGENT MOBILE MESSAGING CLASSIFICATION AND ANTI-SPAM DEFENSE

(75) Inventor: Alexander Bobotek, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 701 days.

(21) Appl. No.: 12/880,945

(22) Filed: Sep. 13, 2010

(65) Prior Publication Data

US 2012/0030293 A1 Feb. 2, 2012

Related U.S. Application Data

(63) Continuation-in-part of application No. 12/844,395, filed on Jul. 27, 2010.

(51) Int. Cl.
| | |
|---|---|
| G06F 15/16 | (2006.01) |
| H04W 4/12 | (2009.01) |
| G06Q 10/10 | (2012.01) |
| H04L 12/58 | (2006.01) |

(52) U.S. Cl.
CPC .............. *G06Q 10/107* (2013.01); *G06Q 10/10* (2013.01); *H04L 12/58* (2013.01); *H04L 12/5895* (2013.01); *H04L 12/585* (2013.01); *H04L 51/12* (2013.01)
USPC .......................... 709/206; 455/412.1; 455/466

(58) Field of Classification Search
USPC ......... 379/88.19, 88.22; 455/410, 411, 412.1, 455/412.2, 414.1, 414.3, 415, 417, 445, 455/466; 709/206, 207
See application file for complete search history.

(56) References Cited

U.S. PATENT DOCUMENTS

| | | |
|---|---|---|
| 8,311,521 B1 | 11/2012 | Paczkowski et al. |
| 2003/0083078 A1 | 5/2003 | Allison et al. |
| 2004/0176072 A1* | 9/2004 | Gellens ...................... 455/412.1 |

(Continued)

FOREIGN PATENT DOCUMENTS

JP 57013533 A 1/1982

OTHER PUBLICATIONS

Free Telus SMS SPAM credits http://www.squidoo.com/telusspam. Last accessed Oct. 28, 2010, 6 pages.

(Continued)

*Primary Examiner* — San Htun
*Assistant Examiner* — Erica Navar
(74) *Attorney, Agent, or Firm* — Amin, Turocy & Watson, LLP

(57) ABSTRACT

Systems, methods, and devices that classify mobile messages and associated mobile message senders are presented. A communication network can comprise a message abuse detector component (MADC) that evaluates a mobile message, for example, labeled as abusive in an abuse report. The MADC can evaluate information relating to the abuse report, wherein the evaluations can include an abuse-report-hash-ratio, an abuse-report-sender-ratio, correlation of mobile message content to known spam content or non-spam content, and/or evaluation of reputation of the mobile message sender or abuse report sender, etc. Based at least in part on the evaluation, the MADC can classify mobile message as spam, subscription related, or as another type of mobile message, and can identify, select, and execute (e.g., automatically) a desired abuse management action(s) based at least in part on the evaluation and predefined message abuse criteria.

20 Claims, 13 Drawing Sheets

(56) References Cited

U.S. PATENT DOCUMENTS

| | | | |
|---|---|---|---|
| 2005/0020289 A1 | 1/2005 | Kim et al. | |
| 2005/0198159 A1* | 9/2005 | Kirsch | 709/206 |
| 2006/0031328 A1 | 2/2006 | Malik | |
| 2006/0036693 A1* | 2/2006 | Hulten et al. | 709/206 |
| 2008/0004048 A1 | 1/2008 | Cai et al. | |
| 2008/0034045 A1* | 2/2008 | Bardsley | 709/206 |

OTHER PUBLICATIONS

BlackBerry App World—SMS Filter http://appworld.blackberry.com/webstore/content/7409. Last accessed Oct. 28, 2010, 1 page.

Sayer. GSMA launches SMS spam reporting service. Posted Mar. 25, 2010. http://www.reuters.com/article/idUS428552958920100326. Last accessed Oct. 28, 2010, 2 pages.

Ez Texting Anti-Spam Policy http://www.eztexting.com/spam-policy.html. Last accessed Oct. 28, 2010, 2 pages.

Baldwin. Customers can choose to block SMS spam. Published Jul. 7, 2010. http://gulfnews.com/business/features/customers-can-choose-to-block-sms-spam-1.651108. Last accessed Oct. 28, 2010, 2 pages.

Cormack, et al. Feature Engineering for Mobile (SMS) Spam Filtering. SIGIR'07, Jul. 23-27, 2007, Amsterdam, The Netherlands. ACM 978-1-59593-597-7/07/0007. Last accessed Oct. 28, 2010, 2 pages.

Sayer. GSMA launches SMS spam reporting service. Posted Mar. 25, 2010, NETWORKWORLD. http://www.networkworld.com/news/2010/032510-gsma-launches-sms-spam-reporting.html?page=1.

Office Action dated Jul. 18, 2012 for U.S. Appl. No. 12/844,395, 25 pages.

Office Action dated Jan. 14, 2013 for U.S. Appl. No. 12/844,395, 19 pages.

Office Action dated Feb. 20, 2014 for U.S. Appl. No. 12/844,395, 28 pages.

* cited by examiner

EMPLOYING REPORT RATIOS FOR INTELLIGENT MOBILE MESSAGING CLASSIFICATION AND ANTI-SPAM DEFENSE

CROSS-REFERENCE TO RELATED APPLICATION AND CLAIM FOR PRIORITY

This application is a continuation-in-part of and claims the benefit of co-pending U.S. patent application Ser. No. 12/844,395, filed on Jul. 27, 2010, entitled "IDENTIFYING ABUSIVE MOBILE MESSAGES AND ASSOCIATED MOBILE MESSAGE SENDERS", the entirety of which is incorporated herein by reference.

TECHNICAL FIELD

The subject innovation generally relates to wireless communications, and, more particularly, to systems, methods, and devices for employing report ratios for intelligent mobile messaging classification and anti-spam defense.

BACKGROUND

Mobile communication devices, such as cellular phones, have become prevalent in everyday life. The use of such devices for messaging (e.g., text messages (e.g., short message service (SMS), enhanced message service (EMS)), multimedia messages (e.g., multimedia messaging service (MMS)), instant messages, Session Initiation Protocol (SIP) messages, etc.) is ever increasing. Some users have unlimited messaging plans, whereby such users are allowed to send or receive an unlimited number of messages over a billing period for a specified fee. However, other users have limited messaging plans, whereby such users pay a certain fee for a specified number of messages per billing period and pay an additional fee per message for each message over the specified number of messages. Still other users have no messaging plan, whereby such users pay a specified fee for each message sent or received during the billing period.

A problem that is on the rise in mobile messaging is spamming, wherein a mobile communication device and/or computer send spam messages originating from the address (e.g., Mobile Subscriber Integrated Services Digital Network Number (MSISDN)) associated with the mobile communication device (e.g., computer connected to the mobile communication device to cause the mobile communication device to quickly send spam messages; computer that is sending spam mobile messages via the account and/or address associated with the mobile communication device). While spam messages have been ubiquitous in emailing for quite some time, they are now on the rise in mobile messaging as well. Pre-paid mobile communication devices with unlimited messaging plans have made it easier and more cost effective for spammers to use mobile communication devices to send spam mobile messages to other mobile communication devices.

Obviously, undesired messages, such as spam or harassing messages, can be a problem for both the user and the wireless service provider. For instance, if the user has a limited messaging plan or no messaging plan, the user may incur a cost for a message that was not desired to be received by the user on the user's mobile communication device, in addition to the inconvenience of having to receive and process (e.g., delete) the undesired message. Undesired messages consume service providers' network resources, forcing service providers to provide costly additional network capacity and/or driving networks traffic volumes to a level where legitimate use of services is or may be denied. Further, when a user contacts a wireless service provider to complain about charges for undesired mobile messages, such complaint calls can be very costly to the wireless service provider, and time consuming for both the user and the wireless service provider. If the problem is a persistent one, users also may become disenchanted with the wireless service and decide to end their subscription with the wireless service provider.

The issue of spamming in mobile messaging is not limited to users receiving undesired spam messages. Another problem arises when a mobile communication device of a user is infected with a malicious software program that automatically sends a spam message to many other mobile communication devices, often without the user even realizing it is happening, resulting in a large messaging bill being incurred by the user. The user then has to take the time to contact the wireless service provider to rectify the problem with the billing as well as the problem with the infected device.

Conventionally, while there have been attempts to address spam emails in email systems, the problem has largely been left unaddressed in mobile messaging. Users typically have been left with the option of contacting (e.g., calling) the wireless service provider to report the receiving (or sending, when the user's device has been infected with a malicious spam program) of undesired messages to try to obtain a credit for the undesired message. Furthermore, for a variety of reasons, spam defenses employed in email systems generally will not be optimal or desirable in the mobile messaging environment.

Another issue with reporting of mobile messaging abuses is that a user may not accurately report know whether a particular message is undesired but subscribed (e.g., where the user may not even realize that the user is subscribed to a service associated with the subscription-related mobile message), spam, harassing (e.g., from someone who does not like the user), or otherwise abusive.

As a wireless service provider (or user) may desire to take different actions (e.g., block messages, close account of device that is spamming, unsubscribe user from a subscription service, etc.) depending upon the nature of the undesired message(s), there is a need to be able to effectively categorize or classify whether a message is a spam mobile message, a virus, a subscription-related mobile message, or a harassing mobile message.

It is desirable to be able to effectively categorize spam mobile messages and the mobile communication device that originated the spam mobile messages, in contrast to subscription-related mobile messages or harassing mobile messages. Further, it is desirable to be able to respond with (e.g., automatically execute) a desired action appropriate to the category of message and/or originating communication device. Furthermore, it is desirable to reduce the costs (e.g., financial costs, time costs, etc.) associated with spam mobile messages for both the mobile communication device users and wireless service providers.

SUMMARY

The following presents a simplified summary of the subject specification in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems, methods, and devices that identify and/or classify (e.g., categorize) mobile messages and associated mobile message senders are presented. For instance, the subject specification can facilitate identifying and classifying abusive mobile messages (e.g., spam mobile messages, such as undesirable bulk commercial messages, phishing messages, messages that include a virus(es) and/or infect a mobile communication device with rogue software, etc.) and associated abusive mobile communication device users, mobile messages relating to a subscription service or distribution list, non-abusive (e.g., ham) mobile messages, and/or other types of mobile messages. In accordance with various embodiments and aspects, a communication network can comprise a message abuse detector component (MADC) that can intelligently identify whether a mobile message, for example, which was labeled as abusive or spam in an abuse report by the recipient of the mobile message, is an abusive spam mobile message or not, and/or identify or classify the type of mobile message it is (e.g., spam mobile message, mobile message relating to a subscription service or distribution list; virus-containing mobile message; harassing mobile message; etc.) based at least in part on predefined message abuse criteria. In an aspect, the MADC can initiate evaluation of information relating to the mobile message associated with the abuse report in response to receiving the abuse report from the UE associated with the recipient of the mobile message (e.g., complaining UE user).

To facilitate identifying or classifying mobile messages, distinguishing between (e.g., classifying) different types of abusive mobile messages, and distinguishing between abusive mobile messages and non-abusive mobile messages (e.g., subscription-related mobile messages, "ham" mobile messages), the MADC can analyze historical information (e.g., call data records (CDRs), abuse reports, or other negative or positive information, if any, associated with the originating path, node or address (e.g., Mobile Subscriber Integrated Services Digital Network Number (MSISDN) of mobile communication device sending the mobile message) associated with the mobile communication device and/or user associated with the originating address) and reputation associated with the originating address of the mobile message and/or associated user, reputation associated with the termination address (e.g., reputation of the termination address, reputation of the associated user) reporting an abusive mobile message, mobile message content (e.g., by employing one or more hash algorithms to hash the mobile message content), information relating to the originating address obtained from honeypot phones, whitelists, blacklists, etc.

Upon identifying or classifying the mobile message, the MADC can execute (e.g., automatically) one or more desired abuse management actions in response, based at least in part on the classification of the mobile message, and in accordance with the predefined message abuse criteria. The desired abuse management actions can comprise, for example, more rigorous content-based message screening or outright blockage (e.g., screening or blocking the mobile messages and/or future mobile messages from the originating address), service shutdown for the originating address (e.g., shutdown mobile messaging for the mobile communication device associated with the originating address), SIM shutdown (e.g., shutdown SIM card of the mobile communication device to shutdown operation of the mobile communication device associated with the originating address), quarantine or sideline the abusive mobile messages, credit a recipient(s) of an abusive mobile message(s), blacklist the originating address and associated mobile communication device, generate and communicate abuse reports relating to the originating address to analysts, other carriers, vendors and/or content providers, etc.

For example, if the MADC identifies or classifies the mobile message as abusive spam, the MADC can automatically block mobile messaging (e.g., from the UE of the reported UE user, to all UEs in the network) associated with the originating address from which the spam mobile message was sent, can automatically credit the account of the UE user for any cost billed to the UE user in relation to receiving the spam mobile message, and/or execute one or more other desired abuse management actions. As another example, if the MADC identifies or classifies the mobile message as being related to a subscription service or distribution list, the MADC can automatically send a message to the UE or other communication device of the mobile message sender (e.g., subscription service provider or distributor that sent the mobile message) to unsubscribe the complaining UE user from the subscription service or remove the complaining UE user from the distribution list, on behalf of the complaining UE user; send a message to the UE of the complaining UE user notifying the complaining UE user that it at least appears that the complaining UE has a subscription to the subscription service or is on a distribution list associated with the distributor, and recommending that the complaining UE user contact the subscription service to request to unsubscribe from the subscription service or the distributor to request to be removed from the distribution list; and/or execute one or more other desired abuse management actions.

In an aspect, in response to receiving an abuse report from a UE operating in the communication network, the MADC can evaluate information relating to the mobile message, which was labeled as abusive (e.g., spam) in the abuse report by the complaining UE user, to facilitate identifying whether the mobile message is abusive spam or not (e.g., determining whether the mobile message is to be classified as abusive or not), identifying whether the mobile message is related to a subscription service provided by a subscription service provider or a distribution list, or is not related to a subscription service or distribution list, or otherwise identifying or classifying the mobile message. For instance, the MADC can perform one or more desired types of evaluations on the information relating to the mobile message under evaluation (e.g., mobile message associated with the abuse report), wherein the one or more desired types of evaluations can include, for example, calculation and evaluation of an abuse-report-hash ratio (e.g., for respective hash values representative of respective portions of content in the mobile message, calculate and evaluate the ratio of the number of abuse-reported mobile messages to the overall number of mobile messages over a specified time window), calculation and evaluation of an abuse-report-sender ratio (e.g., calculate and evaluate the ratio of the number of abuse reports, which identifies a mobile message(s) from an originating address as abusive, received from the complaining UE user(s) to the total number of mobile messages sent by the originating address over a predefined period of time), a cumulative distribution function (CDF) related to a particular ratio, a content correlation evaluation (e.g., comparison of hash values representative of content of the mobile message to known spam content (e.g., "mortgage", "refinancing", etc.) and/or known non-spam content (e.g., "Happy New Year", "Happy Birthday", etc.), evaluation of the reputation of the mobile message sender, evaluation of the reputation of the abuse report sender, calculation and evaluation a unique ID to overall-mobile-message ratio, evaluation to determine whether the originating address associated with the mobile message is a short code or long code, and/or other desired types of evaluations.

For a variety of reasons (e.g., due to a potential lag between receipt of a mobile message and reporting the mobile message as abusive), use of ratios in classifying messages can potentially be more difficult in real-time than in after-the-fact analyses. Thus, it can be desirable for the MADC to cumulatively evaluate information relating to mobile messaging when classifying mobile messages. In still another aspect, with regard to a ratio, such as an abuse-report-hash ratio, as desired, as an alternative to or in addition to, evaluating an abuse-report-hash ratio (e.g., a real-time evaluation of an abuse-report-hash ratio) in relation to a mobile message or mobile message originator, the MADC can employ a CDF of percentage of abuse reports (e.g., abuse-report-hash ratio) associated with a mobile message (or originator of a mobile message(s)) versus the amount of time after receipt an abuse report is generated and sent to the MADC. For instance, a graph can be created with the amount of time after receipt of the message until the abuse report is generated for the respective abuse reports on an X-axis and the percentage of mobile messages reported as abusive on the Y-axis. As desired, such graph can be used instead of evaluating a single point along the CDF. While this example relates to an abuse-report-hash ratio, the subject specification is not so limited, as the MADC can similarly use a desired CDF and/or graphs with regard to other types of ratios disclosed herein. In yet another aspect, the MADC also can normalize evaluation results, including, for example, CDF evaluation results and associated graphs, based at least in part on time of day (e.g., to account for times of day when users are more likely to be awake or active with their communication devices as opposed to times of the day when users are more likely to be asleep or inactive with regard to their communication devices), day of week (e.g., typical business or work day, weekend), type of day (e.g., holiday), etc.

In another aspect, for a respective type of evaluation result (e.g., ratio result or value), the MADC can compare the respective evaluation result to an applicable predefined threshold classifier value or a predefined threshold classifier range of values to facilitate classifying the mobile message under evaluation. For example, if the evaluation is an abuse-report-hash ratio and the ratio value is a high value that is within a predefined upper threshold classifier range of values indicating the mobile message is a spam mobile message, the MADC can classify the mobile message as abusive spam. If the ratio value is a lower value that is within a predefined lower threshold classifier range of values indicating the mobile message is not an abusive spam mobile message, but rather a subscription-related mobile message, the MADC can classify the mobile message as a subscription-related mobile message.

As another example, there can be a first type of evaluation yielding a first evaluation result that can be compared to an applicable (e.g., applicable for that type of evaluation) first predefined threshold classifier range of values, and a second type of evaluation yielding a second evaluation result that can be compared to an applicable second predefined threshold classifier range of values. The MADC can determine whether the first evaluation result is within the first predefined threshold classifier range of values and whether the second evaluation result is within the second predefined threshold classifier range of values. Based at least in part on the results of those determinations, the MADC can classify the mobile message. For instance, if the first evaluation result is within the first predefined threshold classifier range of values, and such first comparison result indicates that the mobile message is indicative of being abusive spam, but the second evaluation result is not within the second predefined threshold classifier range of values, and such second comparison result indicates that the mobile message is indicative of not being related to a subscription, in accordance with the predefined message abuse criteria, this can indicate that the mobile message is an abusive spam message and the MADC can classify the mobile message as an abusive spam message.

In still another aspect, as desired, for example, when more than one type of mobile message evaluation is performed and evaluated collectively, the MADC can desirably apply a weight factor or adjustment factor to a particular type of evaluation result (e.g., spam score), to facilitate giving each type of evaluation result a desired amount of weight relative to the another type(s) of evaluation result, and/or to normalize respective evaluation results relative to each other. For example, when classifying the mobile message as abusive spam or not, a first type of evaluation (e.g., the abuse-report-hash ratio) can or may be a more accurate indicator of whether the mobile message is abusive spam than a second type of evaluation (e.g., abuse-report-sender ratio), and the MADC can apply a desired weighting factor (or desired respective weighting factors) to the first type of evaluation result and/or second type of evaluation result to increase the weight (e.g., importance) of the first type of evaluation result relative to the second type of evaluation result.

In yet another aspect, if the evaluation results (at least initially) are not conclusive or are ambiguous, the MADC can execute a desired abuse management action to sideline and/or throttle mobile messages associated with the originating address identified in the abuse report for a desired amount of time to facilitate providing the MADC time to collect additional information relating to the mobile message or associated originating address (e.g., additional abuse reports associated with the mobile message and/or associated originating address), or otherwise relating to the abuse report. At a desired future time (e.g., an hour later, a day later, a week later, . . . ), the MADC can evaluate (e.g., re-evaluate) the information relating to the abuse report (e.g., the information originally evaluated and information collected since the original evaluation) and can identify or classify whether the mobile message is abusive spam and/or the type of mobile message it is, and identify and select one or more abuse management actions to execute, based at least in part on the most recently performed evaluation and the predefined message abuse criteria. If the response to the abuse report is delayed, for example, due to re-evaluation at a later time, the MADC can send a mobile message to the UE of the complaining UE user and/or the UE of the mobile message sender to notify the respective users that the messaging service provider is "investigating" the complaint in the abuse report and a decision will be forthcoming.

In an aspect, mobile communication device users can be provided with an abusive message reporter component (e.g., abuse report button and/or menu) that can be employed by the user to report an abusive message. For example, the abuse report button and/or menu can be provided to the user via an user interface, wherein the mobile communication device can receive input from the user indicating that a received mobile message is deemed abusive by the user and/or additional information regarding why the user deems the mobile message abusive. The abuse report of the user also can include other information, such as originating address of the mobile message, termination address of the mobile message, time of the mobile message, etc. The abuse report can be communicated by the mobile communication device to the MADC, wherein the MADC can evaluate the received abuse report to determine whether the mobile message is an abusive message or not, and if it is an abusive message, the type of abusive message it is, and can implement (e.g., automatically take) a desired action, as more fully disclosed herein, or take no action, in response to the abuse report based at least in part on such determination regarding the mobile message, in accordance with the predefined message abuse criteria.

In another aspect, a mobile communication device and MADC each can comprise respective filter components that can employ one or more filters, at the UE level or the MADC level, to filter mobile messages and/or to block the receipt of certain undesired mobile messages. For example, a filter component can block mobile messages based at least in part on the originating address, type of content, content rating identifier (e.g., adult content, content suitable for persons 13 and older, content suitable for all ages, etc.), information contained in the mobile message (e.g., block mobile messages relating to mortgage or re-financing), and/or other desired filter parameters. The respective filter components can evaluate a received mobile message, prior to notification of the mobile message being provided to the user, and can apply the filters specified by the user (or default filters) to the mobile message, and can determine whether to block the mobile message or not. If the mobile message is to be blocked, the particular filter component can discard the mobile message and not provide notification of the mobile message to the user; and if it is determined that the mobile message is not to be blocked, the mobile message can be presented to the user in accordance with the presentation criteria specified by the user (e.g., present notification of the received mobile message to the user via the user interface).

In still another aspect, the user can set one or more local filters for the mobile communication device by accessing a local filter menu on the mobile communication device and selecting the desired local filters, or accessing the user account on the web site of the wireless service provider and selecting the desired local filters via a provided interface with a menu of available local filters, wherein the MADC can communicate the desired (e.g., selected) local filters to the mobile communication device, and the mobile communication device can be configured in accordance with the desired local filters. In an embodiment, if a mobile message is locally blocked by a mobile communication device in accordance with the local filters implemented, a signal or message can be automatically or manually sent from the mobile communication device to the MADC in the core network to convey to the MADC that the mobile message was locally blocked, and the user account associated with the mobile communication device can or may be credited (or not billed) by the MADC for costs related to the blocked mobile message.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
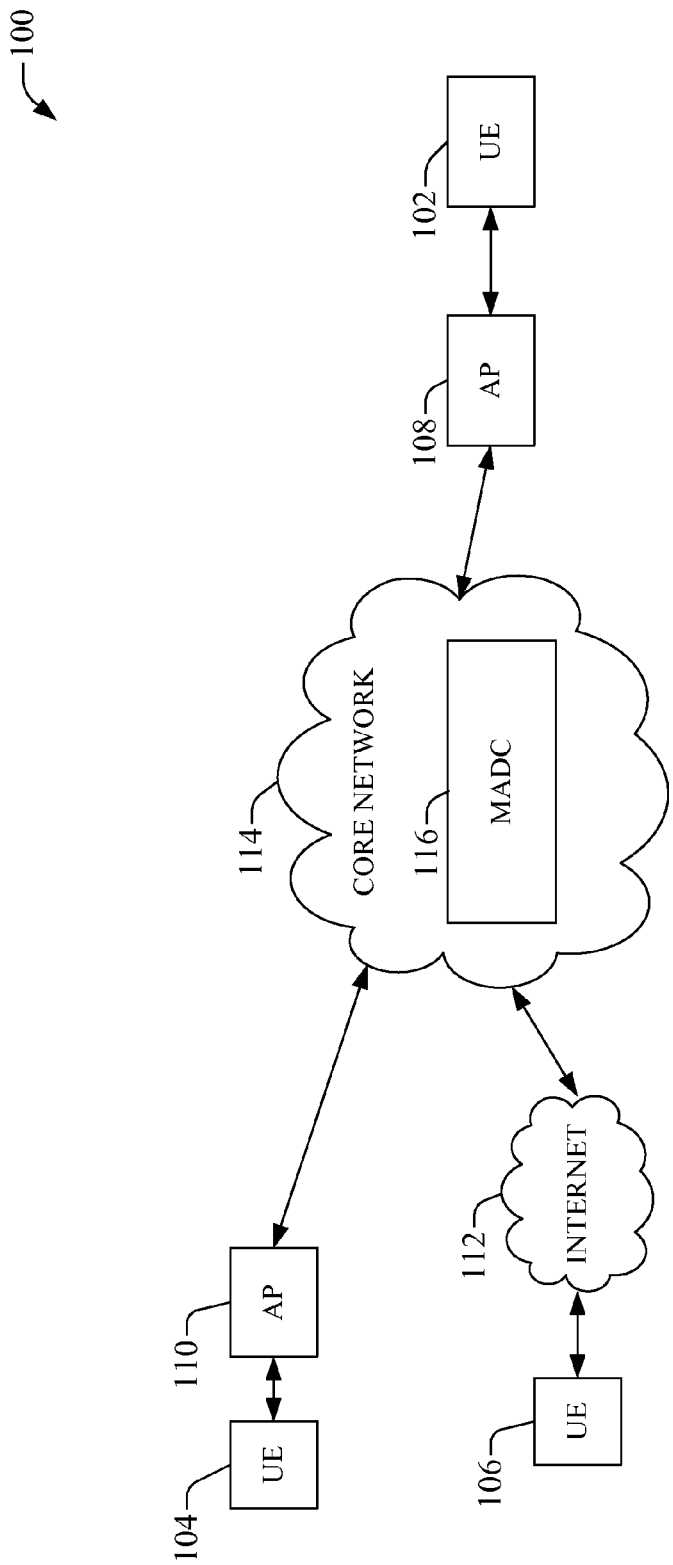
FIG. 1 is a block diagram of an example system that can identify or classify mobile messages and identify or classify associated mobile message senders to facilitate executing (e.g., automatically) a desired abuse management action(s) in accordance with various aspects and embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "mobile device", "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream, or, in an embodiment, a wired (e.g., landline) communication device that has mobile messaging functionality and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

2G Second Generation
3G Third Generation
3GPP Third Generation Partnership Project
4G Fourth Generation
AGPS Assisted GPS
AP Access Point
ADSL Asymmetric Digital Subscriber Line
AWS Advanced Wireless Services
BRAS Broadband Remote Access Server
BTA Basic Trading Area
CDMA Code Division Multiple Access
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Mobile messaging is a popular way to communicate with other mobile communication device users. However, spam mobile messages are becoming an increasing problem. While spam defenses have been employed to attempt to combat spam e-mails, for a variety of reasons, such conventional spam defenses do not translate well to mobile message spamming and generally will have limited effectiveness or otherwise be undesirable in the mobile messaging environment. Typically, abusive mobile messages have to be dealt with via live calls with representatives of wireless service providers, which can be undesirably costly (e.g., economically) to the wireless service providers, and a frustrating and time-consuming experience for the subscriber. It is desirable to be able to effectively classify mobile messages (and the associated mobile message senders) to distinguish between abusive mobile messages (e.g., spam mobile messages), subscription-related mobile messages, harassing mobile messages, etc. Further, it is desirable to be able to take (e.g., automatically execute) a desired abuse management action(s) in response to classification of the mobile message. Furthermore, it is desirable to reduce the costs (e.g., financial costs, time costs, etc.) associated with dealing with spam mobile messages for both the mobile communication device users and wireless service providers.

To that end, systems, methods, and devices that classify mobile messages and associated mobile message senders are presented. The aspects of the subject specification can, for example, allow or enable collaborative spam blocking of spam mobile messages, wherein mobile message recipients can report abusive mobile messages (e.g., spam mobile messages) and the communication network can monitor, sample, (e.g., fully, selectively, or randomly sample), and evaluate mobile messages, including abuse-reported mobile messages, to facilitate identifying or classifying mobile messages and mobile message senders and executing (e.g., automatically) a desired abuse management action(s) (e.g., blocking spam mobile messages). The communication network can comprise a message abuse detector component (MADC) that can evaluate a mobile message, for example, which is labeled as abusive in an abuse report received by the MADC from a UE of the abuse reporter, or is sampled. The MADC can evaluate information relating to the abuse report, wherein the evaluations can include an abuse-report-hash-ratio, an abuse-report-sender-ratio, correlation of mobile message content to known spam content or non-spam content, evaluation of reputation of the mobile message sender, evaluation of reputation of abuse report sender, evaluation as to whether the originating address of the mobile message is a short code or long code, etc. Based at least in part on the evaluation results, the MADC can classify mobile message as spam, subscription related, or as another type of mobile message, and can identify, select, and execute (e.g., automatically) a desired abuse management action(s) (e.g., blocking mobile messaging associated with the originating address from which the abusive mobile message was sent, crediting the account of the recipient of an abusive mobile message, unsubscribing or facilitating unsubscription of the recipient of a mobile message from a subscription service, etc.) based at least in part on the evaluation and predefined message abuse criteria.

Referring to the drawings, FIG. 1 is a block diagram of an example system 100 that can identify or classify mobile messages (e.g., text messages (e.g., short message service (SMS), enhanced message service (EMS)), multimedia messages (e.g., multimedia messaging service (MMS)), instant messages, Session Initiation Protocol (SIP) messages, etc.) and identify or classify associated mobile message senders to facilitate executing (e.g., automatically) a desired abuse management action(s) in accordance with various aspects and embodiments of the disclosed subject matter. Aspects and embodiments of the subject specification can be employed in wireless, wired and converged (e.g., wireless and wired) communication networks. In an aspect, information relating to a mobile message can be evaluated, for example, in response to an abuse report from a UE user that received the mobile message to facilitate classifying the mobile message. The mobile messages can be classified as abusive mobile messages (e.g., spam mobile messages, such as undesirable bulk commercial messages, phishing messages, messages that include a virus(es) and/or infect a mobile communication device with rogue software, etc.), mobile messages relating to a subscription service or distribution list, harassing mobile messages, non-abusive (e.g., "ham") mobile messages, or another type(s) of mobile message.

In an aspect, the system 100 can include a desired number of UEs (e.g., mobile and/or wireless communication device, such as a mobile phone (e.g., 3GPP UMTS phone), personal digital assistant (PDA), landline phone with mobile messaging functionality, computer, IP television (IPTV), gaming console, STB, multi-media recorder/player, video recorder/player, audio recorder/player, printer, etc.), such as UE 102, UE 104, and/or UE 106 in the communication network environment. UE 102, UE 104, and/or UE 106 can be located in a wireless portion (e.g., region) of the communication network, for example. In an embodiment, UE 106 also or alternatively can have a wireline connection and/or can be a wired or landline communication device (e.g., landline phone) that has mobile messaging functionality to send or receive mobile messages from other UEs in the network.

UE 102 can be connected (e.g., wirelessly connected) to an AP 108 (e.g., macro AP, femto AP, pico AP, etc.) that can serve a specified coverage area to facilitate communication by the UE 102 and other UEs (e.g., UE 104, UE 106) in the wireless communication network environment. UE 104 can be connected (e.g., wirelessly connected) to an AP 110 (e.g., macro AP, femto AP, pico AP, etc.) that can serve a specified coverage area (e.g., a different coverage area than AP 108) to facilitate communication by the UE 104 and other UEs (e.g., UE 102, UE 106) in the wireless communication network environment. The APs 108 and 110 can serve respective coverage cells (e.g., macrocells, femtocells, picocells, etc.) that can cover respective specified areas, and the APs 108 and 110 can service mobile wireless devices, such as UE 102 and UE 104, located in the respective areas covered by the respective cells, where such coverage can be achieved via a wireless link (e.g., uplink (UL), downlink (DL)). When an attachment attempt is successful, the UE 102 can be served by the AP 108, and UE 104 can be served by AP 110, and incoming voice and data traffic can be paged and routed to the UE 102 through the AP 108, and to the UE 104 through the AP 110, respectively, and outgoing voice and data traffic from the UE 102 and/or UE 104 can be paged and routed through the AP 108 or AP 110, respectively to other communication devices (e.g., another UE). In an aspect, UE 102, UE 104, and/or UE 106 can be connected and can communicate wirelessly using virtually any desired wireless technology, including, for example, cellular, Wi-Fi, Wi-Max, wireless local area networks (WLAN), etc.

In an aspect, the UE 106 can be communicating with the Internet 112 (or another communication network (e.g., IP-based network)) via a wired or wireless communication connection, wherein, for example, a wired communication connection can be a communication connection that can communicate voice or data, and/or can be a DSL-type or broadband connection facilitated via an Ethernet connection, and a wireless communication connection can be facilitated via a connection of the UE 106 to an AP (not shown). The UE 106 can transmit mobile messages via a wired or wireless connection through the Internet 112, or other communication network (not shown), and the core network 114 to other communication devices, or by accessing the user account associated with the UE 106 on the wireless service provider's web site via a wired or wireless communication connection, wherein the web site can allow mobile communication device users to use a UE 106 or other communication device (e.g., personal computer) to send mobile messages from the originating address associated with the UE 106 via the Internet 112 to other communication devices, in the communication network environment.

In another aspect, the AP 108 and AP 110, and the Internet 112 can be associated with (e.g., communicatively connected to) the core network 114 (e.g., 2G, 3G, 4G, or xG network, where x can be virtually any desired integer or real value) that can facilitate wireless communication by the UE 102, UE 104, UE 106, and/or other UEs associated with the core network 114 with other communication devices (e.g., wireless communication devices, wireline communication devices) in the communication network environment. The core network 114 can facilitate routing voice and data communications between a communication device(s) (e.g., UE 102, UE 104, UE 106) and other communication devices (e.g., UE, landline phone, computer, email server, STB, multimedia server, audio server, video server, news server, financial or stock information server, other communication devices, etc.) associated with the core network 114 in the communication network environment. The core network 114 also can allocate resources to the UEs in the network, convert or enforce protocols, establish and enforce Quality of Service (QoS) for the UEs, provide applications or services in the network, translate signals, and/or perform other desired functions to facilitate system interoperability and communication in the wireless communication network. The core network 114 further can include desired components, such as routers, nodes, switches, interfaces, controllers, etc., that can facilitate communication of data between communication devices in the communication network environment.

In an embodiment, the core network 114 also can comprise a message abuse detector component (MADC) 116 that can intelligently identify and/or classify (e.g., categorize) mobile messages (e.g., classify mobile messages as spam mobile messages, subscription-related mobile messages, non-abusive mobile messages, etc.) and identify mobile message senders (e.g., senders of spam mobile messages) based at least in part on predefined message abuse criteria. Spam mobile messages can include, for example, undesirable bulk commercial messages (e.g., messages relating to mortgage or refinancing, messages related to sexual products or content, etc.), phishing messages, messages that include a virus(es) that can negatively affect operation of the receiving UE and/or infect a UE with rogue software (e.g., to at least partially take over operation of the UE), etc. The predefined message abuse criteria can relate to and/or be specified based at least in part on, for example, abuse reports, an abuse-report-hash ratio (as more fully disclosed herein), an abuse-report-sender ratio (as more fully disclosed herein), correlation of mobile message content (e.g., hash values representative of respective portions of mobile message content) to known spam content or known ham content), the number of mobile messages sent from an originating path, node or address associated with a UE over a given period of time, the unique ID to overall-mobile-message ratio for high-count mobile message senders (as more fully disclosed herein), historical information relating to mobile message sending associated with the originating path, node or address, information on CDRs, reputation associated with an originating path, node or address or termination address associated with a mobile message, whether an originating path, node or address is identified as or alleged to be an abusive mobile message sender in an abuse report, whether an originating path, node, or address is identified as having sent a mobile message to a honeypot phone, mobile message content, type of mobile message content, whether the mobile message is being sent from an originating path, node or address associated with a user that is in an introductory subscription period with regard to the wireless service subscription, whitelist information, blacklist information, etc.

It is to be appreciated and understood that the term "predefined", as used herein, can refer to a specified, defined, and/or learned criterion, rule, value, level, etc. For instance, the MADC 116 (or another component, such as an AI component, that employs one or more AI techniques, as more fully disclosed herein) can learn that a different parameter value can facilitate more accurately classifying a mobile message than a current predefined parameter value and can dynamically implement the different, learned parameter value as a new predefined parameter value. It is to be appreciated and understood that, while the subject specification describes various features and functions in relation to a mobile message associated with an originating address, the various features and functions can be similarly applied to originating paths and/or originating nodes with which a mobile message can or may be associated, for example, when the mobile message is communicated via the core network 114.

In an aspect, the MADC 116 can initiate evaluation of and can evaluate information relating to a mobile message(s), for example, in response to receiving an abuse report from a UE (e.g., 102) associated with the recipient of the mobile message (e.g., complaining UE user) sent from another UE (e.g., 104), or in response to receiving a honeypot report(s) (e.g., a predefined number of honeypot reports relating to the same originating address and/or mobile messages having same or similar content) indicating that a honeypot phone has received a mobile message from a specified originating address and/or having specified mobile message content. To facilitate distinguishing between (e.g., classifying) different types of abusive mobile messages, and distinguishing between abusive mobile messages and non-abusive mobile messages (e.g., legitimate subscription-related mobile messages, "ham" mobile messages), the MADC 116 can analyze or evaluate mobile messaging related information, such as, for example, origination and/or destination (e.g., termination) address information (e.g., originating Mobile Subscriber Integrated Services Digital Network Number (MSISDN), termination MSISDN), a current abuse report(s), historical information (e.g., call data records (CDRs), historical abuse reports, or other negative or positive information, if any, associated with the originating address of mobile communication device sending the mobile message) associated with the mobile communication device and/or user associated with the originating address) and reputation associated with the originating address of the mobile message and/or associated user, reputation associated with the termination address (e.g., reputation of the termination address, reputation of the associated user) reporting an abusive mobile message, mobile message content (e.g., by employing one or more hash algorithms to hash the mobile message content), information relating to the originating address obtained from honeypot phones, whitelist information (e.g., whitelist of addresses from which mobile messaging is desired by the subscriber), blacklist information (e.g., blacklist of addresses from which mobile messaging is not desired by the subscriber), etc.

Upon identifying or classifying the mobile message (e.g., classifying the mobile message as an abusive spam mobile message, classifying the mobile message as a non-abusive mobile message related to a subscription service or distribution list, classifying the mobile message as being a harassing mobile message, classifying the mobile message as a "ham" mobile message, classifying the mobile message as a message containing a virus, or classifying the labeling of the mobile message as abusive in an abuse report is a false positive, etc.), the MADC 116 can execute (e.g., automatically) one or more desired abuse management actions in response, based at least in part on the classification of the mobile message, and in accordance with the predefined message abuse criteria. The desired abuse management actions can comprise, for example, content blockage (e.g., blocking the mobile messages and/or future mobile messages from the originating address), service shutdown for the originating address (e.g., shutdown mobile messaging for the mobile communication device associated with the originating address), SIM shutdown (e.g., shutdown SIM card of the mobile communication device to shutdown operation of the mobile communication device associated with the originating address), quarantine or sideline the abusive mobile messages, credit a recipient(s) of an abusive mobile message(s), blacklist the originating address and associated mobile communication device, generate and communicate abuse reports relating to the originating address to analysts, other carriers, vendors and/or content providers, etc.

For example, if the MADC 116 identifies or classifies the mobile message as abusive spam, the MADC 116 can automatically block mobile messaging (e.g., to the UE of the complaining UE user, to all UEs associated with the core network 114 or other networks in the communication network environment) associated with the originating address from which the spam mobile message was sent and/or can automatically credit the account of the UE user for any cost billed to the UE user in relation to receiving the spam mobile message. As another example, if the MADC 116 identifies or classifies the mobile message as being related to a subscription service or distribution list, the MADC 116 can automatically send a message (e.g., a request) to the UE or other communication device of the mobile message sender (e.g., subscription service provider or distributor that sent the mobile message) to unsubscribe the complaining UE user from the subscription service or remove the complaining UE user from the distribution list, on behalf of the complaining UE user; send a message to the UE (e.g., 102) of the complaining UE user notifying the complaining UE user that it at least appears that the complaining UE user has a subscription to the subscription service or the UE's address is on a distribution list associated with the distributor (e.g., a distributor of content not known to the recipient of the mobile message content, or a distributor of content known to the recipient of the mobile message (e.g., recipient's friend or acquaintance who sends mobile message content to all UE users on a distribution list of the friend or acquaintance)), and recommending that the complaining UE user contact the subscription service to request to unsubscribe from the subscription service or the distributor to request to be removed from the distribution list. As still another example, if the MADC 116 classifies the mobile message as being non-abusive, even though the abuse report sender labeled the mobile message as abusive, the MADC 116 can identify the labeling of the mobile message as abusive as a false positive, and can attach or include the false positive indication and/or otherwise correct the abuse report, and/or remove or re-label the abuse report, so that the historical record relating to the originating address and associated user are accurate (e.g., so the false-positive abuse report is not counted or is at least discounted in future evaluations relating to mobile messaging involving the originating address and associated user).

In an aspect, in response to receiving an abuse report from a UE (e.g., 102) relating to a mobile message alleged to be abusive and/or receiving a predefined number of honeypot reports (e.g., one or more honeypot reports) indicating a mobile message was/were received by a honeypot phone(s), the MADC 116 can evaluate information relating to the mobile message to facilitate identifying whether the mobile message is abusive spam or not, identifying whether the mobile message is related to a subscription service provided by a subscription service provider or a distribution list, or is not related to a subscription service or distribution list, or otherwise identifying or classifying the mobile message. For instance, the MADC 116 can perform one or more desired types of evaluations on the information relating to the mobile message under evaluation (e.g., mobile message associated with the abuse report). The one or more desired types of evaluations can include, for example, calculation and evaluation of an abuse-report-hash ratio, calculation and evaluation of an abuse-report-sender ratio, a content correlation evaluation, evaluation of the reputation of the mobile message sender, evaluation of the reputation of the abuse report sender, calculation and evaluation of a unique ID to overall-mobile-message ratio, evaluation to determine whether the originating address is a short code or long code, and/or other desired types of evaluations.

In one aspect, the MADC 116 can calculate and evaluate an abuse-report-hash ratio. The MADC 116 can employ one or more desired hashing techniques (e.g., hashing algorithms designed for spam mobile message detection), such as more fully disclosed herein, for example, to hash the mobile message under evaluation to generate hash values that can be representative of respective portions (e.g., word(s), image(s), URL(s), etc.) of the content of the mobile message under evaluation. For each of desired (e.g., selected) hash values associated with the mobile message, the MADC 116 can identify one or more mobile messages (which can include the mobile message under evaluation), during a given time window (e.g., a predefined period of time, for example, proximate to the time the mobile message was sent), that contain the hash value under consideration. From the mobile messages that contain the hash value under consideration, the MADC 116 also can identify the number of those mobile messages that are associated with an abuse report (e.g., labeled as abusive in an abuse report). The MADC 116 can calculate the ratio of the number of abuse-reported mobile messages to the overall number of mobile messages over the given time window to obtain an abuse-report-hash ratio value.

The MADC 116 can compare the abuse-report-hash ratio value to an applicable predefined threshold classifier ratio value (e.g., predefined threshold abuse-report-hash classifier ratio value) or applicable predefined threshold classifier range of ratio values (e.g., respective predefined threshold abuse-report-hash classifier ranges of ratio values) to facilitate classifying the mobile message. For instance, if the abuse-report-hash ratio value is at or above the predefined threshold abuse-report-hash classifier ratio value or within the predefined upper threshold abuse-report-hash classifier ranges of ratio values, the MADC 116 can classify the mobile message as a spam mobile message. If the abuse-report-hash ratio value is below the predefined threshold abuse-report-hash classifier ratio value or is not within the predefined upper threshold abuse-report-hash classifier ranges of ratio values, the MADC 116 can classify the mobile message as not being a spam mobile message, being indicative of not being a spam mobile message, or being indicative of a mobile message relating to a subscription service or distribution list, in accordance with the predefined message abuse criteria. As desired, there can be additional threshold ratio levels that can be employed to provide finer granularity to the classification to facilitate more accurately classifying the mobile message.

It is to be appreciated and understood that, while certain aspects of the disclosed subject matter ratios are described herein with regard to hashing information (e.g., mobile messages, abuse reports, etc.) and determining a ratio using the hashed information, the subject specification is not so limited, and, as desired, the information can be processed and evaluated by the MADC 116 without being hashed, and the MADC 116 can determine the desired ratio using the information without it being hashed. Alternatively, a null hash function can be employed, wherein the null hash function, when applied to information by the MADC 116, can return the same information as a result.

In another aspect, the MADC 116 can calculate and evaluate an abuse-report-sender ratio, for example, in response to a receive abuse report(s) from an abuse report sender(s). The MADC 116 can retrieve information relating to abuse reports from abuse report senders in relation to mobile messages received by the abuse report senders from an originating address and other mobile messages sent from the originating address from a data store or repository. The MADC 116 can identify the number of received abuse reports that identify the messages from the originating address as abusive over a desired (e.g., predefined) period of time. The MADC 116 also can identify the total number of mobile messages sent from the UE associated with the originating address over the desired period of time. The MADC 116 can calculate the ratio of the number of abuse reports received from the complaining UE user(s) to the total number of mobile messages sent by the UE associated with the originating address over the desired period of time to obtain an abuse-report-sender ratio value.

The MADC 116 can compare the abuse-report-sender ratio value to an applicable predefined threshold classifier ratio value (e.g., predefined threshold abuse-report-sender classifier ratio value) or applicable predefined threshold classifier range of ratio values (e.g., respective predefined threshold abuse-report-sender classifier ranges of ratio values) to facilitate classifying the mobile message. For instance, if the abuse-report-sender ratio value is at or above the predefined threshold abuse-report-sender classifier ratio value or within the predefined upper threshold abuse-report-sender classifier ranges of ratio values, the MADC 116 can determine that the alleged abuse claim(s) is likely accurate or valid and/or can classify the mobile message as being an abusive spam mobile message. If the abuse-report-sender ratio value is below the predefined threshold abuse-report-sender classifier ratio value or is not within the predefined upper threshold abuse-report-sender classifier ranges of ratio values, the MADC 116 can determine that the alleged abuse claim(s) is a false positive, and/or can identify or classify the mobile message as, for example, at least being indicative of not being a spam mobile message, in accordance with the predefined message abuse criteria. As desired, there can be additional threshold ratio levels that can be employed to provide finer granularity to the classification to facilitate more accurately classifying the mobile message. When an abuse-report-sender ratio value is below the predefined threshold abuse-report-sender classifier ratio value or is not within the predefined upper threshold abuse-report-sender classifier ranges of ratio values, it can be indicative that the abuse report sender(s) is mistakenly or maliciously sending abuse reports, and, as a result, the abuse report(s) under evaluation can be discounted accordingly (e.g., indicated as a false positive and/or re-labeled so that the abuse report is not considered to be or counted as an abuse report in future evaluations).

For a variety of reasons (e.g., due to a potential lag between receipt of a mobile message and reporting the mobile message as abusive), use of ratios in classifying messages can potentially be more difficult in real-time than in after-the-fact analyses. Thus, it can be desirable for the MADC 116 to cumulatively evaluate information relating to mobile messaging when classifying mobile messages. In still another aspect, with regard to a ratio, such as an abuse-report-hash ratio, as desired, as an alternative to or in addition to, evaluating an abuse-report-hash ratio (e.g., a real-time evaluation of an abuse-report-hash ratio) in relation to a mobile message or mobile message originator, the MADC 116 can employ a cumulative distribution function (CDF) of the percentage of abuse reports (e.g., abuse-report-hash ratio) associated with a mobile message (or originator of a mobile message(s)) versus the amount of time after receipt an abuse report is generated by a UE associated with a mobile message recipient and sent to the MADC 116. For instance, the MADC 116 can generate a graph with the amount of time after receipt of the mobile message until the abuse report is generated for the respective abuse reports on an X-axis and the percentage of mobile messages reported as abusive on the Y-axis. As desired, such graph can be used instead of evaluating a single point along the CDF. It is to be appreciated and understood that, while this example relates to an abuse-report-hash ratio, the subject specification is not so limited, as the MADC 116 can similarly use a desired CDF and/or graphs with regard to other types of ratios disclosed herein. In yet another aspect, the MADC 116 also can normalize evaluation results, including, for example, CDF evaluation results and associated graphs, based at least in part on time of day (e.g., to account for times of day when users are more likely to be awake or active with their communication devices as opposed to times of the day when users are more likely to be asleep or inactive with regard to their communication devices), day of week (e.g., typical business or work day, weekend), type of day (e.g., holiday), etc.

In an aspect, the MADC 116 can evaluate the correlation of the content of the mobile message associated with the abuse report to known spam content (e.g., "mortgage", "refinancing", etc.) and/or known "ham" content (e.g., "Happy New Year", "Happy Birthday", etc.). For instance, the MADC 116 can employ one or more desired hashing techniques (e.g., hashing algorithms designed for spam mobile message detection) to hash the mobile message under evaluation to obtain hash values that can be representative of the content, or portion thereof, of the mobile message. For each of desired (e.g., selected) hash values associated with the mobile message, the MADC 116 can compare the hash value under evaluation to known spam content or known "ham" content to obtain a content correlation result for each evaluated hash value, wherein the known spam content or known "ham" content can be retrieved from a data store by the MADC 116, for example. In an aspect, the spam and "ham" information store in the data store can be updated as new spam content and new "ham" content is identified, for example, by the MADC 116 or another component. The MADC 116 can apply a predefined content correlation metric to the respective content correlation results of the evaluated hash values to obtain a spam content correlation result (e.g., to quantify the correlation of the mobile message content to known spam) to facilitate classifying the mobile message, in accordance with the predefined message abuse criteria. The predefined content correlation metric can be desirably structured or defined such that proper weighting or scoring is given to respective results for respective hash values (e.g., a result that indicates spam can be given more weight than a result that indicates "ham") so that a spammer is not able to disguise a spam mobile message as a "ham" mobile message by also including a significant amount of "ham" content in the spam mobile message (e.g., inserting a significant amount of "ham" content amongst spam content in a mobile message) in order to hinder detection of the spam mobile message.

The MADC 116 can compare the spam content correlation result to a predefined threshold level of spam correlation. If the amount of spam content correlation (e.g., the spam content correlation result) is at or over a predefined threshold level of spam correlation, the MADC 116 can classify the mobile message as spam. If the amount of spam content correlation is below the predefined threshold level of spam correlation, the MADC 116 can classify the mobile message as not being spam or at least indicative of not being spam. As desired, there can be additional threshold content correlation levels that can be employed to provide finer granularity to the classification to facilitate more accurately classifying the mobile message.

In yet another aspect, in response to a received abuse report(s) or honeypot report(s) relating to a mobile message(s), the MADC 116 can evaluate the mobile message by calculating the unique ID to overall-mobile-message ratio in relation to the originating address of the mobile message. Alternatively, as desired, the MADC 116 initially can determine whether the mobile message sender is a high-count mobile message sender (e.g., a sender that has sent a number of mobile messages that meets or exceeds a predefined maximum threshold number of mobile messages applicable for a given period of time (e.g., one minute, one hour, one day, one week, . . . )), and can perform the unique ID to overall-mobile-message ratio in relation to the originating address of the mobile message if the mobile message sender is identified as a high-count mobile message sender.

As an example, the MADC 116 can monitor and selectively (or randomly, or fully) sample a desired portion of mobile messages associated with the originating address in a message stream in the core network 114, and/or retrieve information relating to mobile messages previously sent from the originating address, over a specified time window, to facilitate identifying whether the mobile message in the abuse report or honeypot report, or any of the other mobile messages associated with the originating address, is/are abusive, e.g., spam mobile messages. In an aspect, the MADC 116 can count the total number of mobile messages sent from the originating address (e.g., associated with UE 104) over the specified time window. From those mobile messages, the MADC 116 also can identify the number of unique termination (e.g., recipient) addresses associated with the mobile messages sent from the originating address. The MADC 116 can calculate and evaluate the ratio of the number of unique termination addresses to the number of originated messages (also referred to herein as unique ID to overall-mobile-message ratio) to obtain a unique ID to overall-mobile-message ratio value. If the MADC 116 determines the unique ID to overall-mobile-message ratio value meets or exceeds a predefined threshold classifier ratio value (e.g., a predefined threshold unique ID to overall-mobile-message classifier ratio value) indicative of mobile message abuse (e.g., a relatively high ratio value, such as, for example, 0.9 (or other desired relatively high ratio value) on a scale ranging from 0.0 to 1.0), in accordance with the predefined message abuse criteria, the MADC 116 can classify the mobile messages associated with the originating address as abusive (e.g., spam) and the originating address as being associated with an abusive mobile message sender, or at least can identify the mobile messages associated with the originating address as indicative of being abusive and identify the originating address as being indicative of being associated with an abusive mobile message sender.

In still another aspect, the MADC 116 can evaluate reputation information associated with the originating address under evaluation and/or associated mobile message sender to facilitate identifying a reputation level of the originating address or mobile message sender. Additionally or alternatively, the MADC 116 can obtain reputation information or a reputation level associated with the originating address or mobile message sender from other sources that collect information relating to reputation of respective mobile message senders and/or assign a reputation rank or reputation value or level to respective mobile message senders. The reputation level associated with an originating address or mobile message sender can be determined based at least in part on, for example, the length of time the originating address has been used by the mobile message sender, the number of abuse reports that label a mobile message associated with the originating address as abusive, the number of honeypot reports that indicate that a mobile message was received from the originating address, whether and/or to what extent mobile messaging associated with the originating address has been classified as abusive (e.g., spam), etc.

In yet another aspect, the MADC 116 can evaluate reputation information associated with the abuse report sender (e.g., address from which the abuse report was sent) to facilitate identifying a reputation level of the abuse report sender. Additionally or alternatively, the MADC 116 can obtain reputation information or a reputation level associated with the abuse report sender from other sources. The reputation level associated with an abuse report sender can be determined based at least in part on, for example, the length of time the abuse report sender has been associated with the current mobile address, the number of abuse reports submitted by the abuse report sender, the number of those submitted abuse reports that were validated and the number that were invalidated, the number of appeals, which relate to abuse report decisions, by the abuse report sender and the respective numbers of appeals won and appeals lost by the abuse report sender, etc.

In an aspect, the reputation of a particular abuse report sender can be established, identified, or adjusted, based at least in part on correlation of the abuse reports from the particular abuse report sender with abuse reports from trusted abuse reporters (e.g., abuse reporters that have established a good reputation with regard to accurately reporting abusive mobile messages) or other information that indicates a given mobile message(s) is or is not an abusive mobile message (e.g., spam). In accordance with the predefined message abuse criteria, the MADC 116 can evaluate the reputation of an abuse report sender to facilitate classifying a mobile message(s) that the abuse report sender has indicated is an abusive message in an abuse report. For instance, the reputation of an abuse report sender can have a corresponding reputation value associated therewith, wherein the reputation value can be applied to a value associated with an abuse report received from the abuse report sender to desirably weight the value of the abuse report so the abuse report can be desirably (e.g., properly) considered and evaluated, in accordance with the predefined message abuse criteria.

In addition to being able to classify a mobile message as an abusive mobile message or not, it also can be desirable to be able to further classify (e.g., classify with finer granularity) a mobile message, for example, to classify the mobile message as a spam mobile message (e.g., general spam, mobile message containing a virus, etc.), a harassing mobile message, a mobile message relating to a subscription service or distribution list (or not), etc., for a variety of reasons. For example, a UE user may submit an abuse report indicating that a mobile message associated with an originating address is abusive spam. It can or may be undesirable for the MADC 116 to classify the originating address associated with the mobile message as being associated with an abusive mobile message sender, and/or not classify the mobile message as being related to a subscription service or distribution list, solely based on the UE user indicating that the mobile message is abusive in the abuse report, as the information provided by the user in the abuse report may not be reliable for a variety of reasons (e.g., the complaining UE user (e.g., mobile message recipient) is unaware or has forgotten that the UE user has a subscription with the mobile message sender or is on a legitimate distribution list of the mobile message sender, the complaining UE user is acting maliciously against the mobile message sender, the complaining UE user is aware of the subscription, but is personally dissatisfied with the subscription service (although the overall reputation of the subscription service provider is relatively good) or is improperly attempting to get the user's account credited for the cost of receiving the mobile message, etc.). Further, there can or may be an undesirable or unwarranted cost if mobile messages from a subscription service provider offering a subscription-based service, mobile messages from a distributor of content, are blocked or other sanctions are imposed against the subscription service provider or distributor, as there can be loss of income to the subscription service provider or distributor as well as loss of income to the wireless service provider by suspending or blocking mobile messaging by the subscription service provider or distributor. Thus, it can be desirable for the MADC 116 to perform one or more evaluations that can facilitate identifying and/or classifying a mobile message (e.g., a mobile message already classified as non-abusive, e.g., non-spam) as being related to a subscription service or a distribution list, which can be a non-abusive mobile message (at least in many instances a subscription-related or distribution-list related mobile message can be a non-abusive mobile message).

For example, in certain instances, a first type of evaluation can or may provide an evaluation result that can strongly indicate that a mobile message is non-abusive, e.g., non-spam, but does not sufficiently indicate whether the mobile message is related to a subscription service or distribution list, or not. For instance, in response to a received abuse report relating to a mobile message sent from a particular originating address, the MADC 116 can perform a first type of evaluation (e.g., calculation and evaluation of an abuse-report-hash ratio, content correlation evaluation, etc.) on the mobile message and can classify the mobile message as a non-abusive (e.g., non-spam) mobile message based at least in part on the evaluation and the predefined message abuse criteria, however, whether the mobile message is related to a subscription service or distribution list may remain unclear due in part to the evaluation results in relation to the predefined message abuse criteria (e.g., and associated classification or message abuse rules). In such instance, the MADC 116 can perform one or more other evaluations relating to the mobile message (e.g., non-abusive mobile message) and/or associated originating address to facilitate determining whether the mobile message is related to a subscription service or distribution list, or not.

One type of mobile message evaluation that can facilitate determining whether the non-abusive mobile message is related to a subscription service or distribution list is to count the number of mobile messages sent from the originating address over a specified time window. If the number of mobile message sent from the originating address is at or over a predefined threshold number of mobile messages, which is applicable for the specified time window, the MADC 116 can classify the mobile message as being related to a subscription service or distribution list. This evaluation of the number of mobile messages sent from an originating address can be a relatively accurate indicator of whether the non-abusive mobile message is related to a subscription service or distribution list, when the MADC 116 has already classified the mobile message as non-abusive.

However, in some instances, it can be desirable to perform an alternative or additional mobile message evaluation that can or may improve accuracy in classifying the non-abusive mobile message as being related to a subscription service or distribution list, or not. Thus, alternatively or additionally, the MADC 116 can calculate and evaluate the unique ID to over-all-mobile-message ratio relating to mobile messages sent from the originating address during a specified time window, as more fully disclosed herein; identify whether the originating address is a short code or long code, as more fully disclosed herein, evaluate the reputation of the originating address and/or mobile message sender, as more fully disclosed herein, and/or perform another type of evaluation in relation to the mobile message.

For instance, as desired, the MADC 116 can analyze or evaluate originating address information of a mobile message sender to identify whether the originating address is a short code or long code, wherein a short code (e.g., 5-number originating address, as opposed to a 10-number originating address) can be indicative of the mobile message sender being, or being associated with, a subscription service. In another aspect, the MADC 116 can retrieve information relating to respective originating addresses of respective known subscription service providers, wherein the originating address of the mobile message can be compared to originating addresses of known subscription service providers to identify whether the originating address of the mobile message matches any of the originating addresses of known subscription service providers to facilitate classifying the mobile message. The MADC 116 additionally or alternatively can analyze or evaluate information relating to the reputation associated with originating address and/or associated user, wherein an originating address or user associated with a subscription service is more likely to have established a reputation and/or to have a better reputation (e.g., less abuse reports) than an abusive mobile message sender, or a mobile message sender who has not sent enough mobile messages to establish a strong (e.g., well established) and good reputation.

The MADC 116 can evaluate the first type of evaluation, which resulted in a classification of the mobile message as not being an abusive spam message (or at least as indicative of not being abusive spam), with the other analyses (e.g., short code/long code analysis, reputation analysis) and can identify or classify the originating address as being associated with a subscription service (or distribution list), for example, if the abuse-report-hash ratio value is below the predefined threshold abuse-report-hash ratio value—thereby classifying the mobile message as not being abusive spam (or at least as indicative of not being abusive spam), the originating address is a short code, and/or the reputation associated with the originating address is relatively good, the MADC 116 can classify the mobile message and originating address as being associated with a subscription service or distribution list; or, even if the abuse-report-hash ratio value is at or above the predefined threshold abuse-report-hash ratio value (but in such instance the abuse-report-hash ratio value is only indicative of the mobile message being abusive spam), the MADC 116 can or may still classify the originating address as being associated with a subscription service or distribution list, for instance, if the originating address is a short code and/or the reputation associated with the originating address is sufficiently high (e.g., good or better, wherein a good reputation can be a reputation that has a reputation value that at least meets a predefined minimum threshold reputation value).

If the MADC 116 classifies the originating address as being associated with a subscription service or distribution list, the MADC 116 can execute a desired abuse management action(s), including, for example, determining that mobile messages associated with the originating address can continue to be communicated in the core network 114, revising the abuse report to indicate that the mobile messages are not deemed abusive, and/or discarding the abuse report or change the report to a different kind of report (e.g., false positive mobile message report), executing (e.g., automatically) a desired unsubscribing action(s), etc. It is to be appreciated and understood that other types of information (e.g., historical information, honeypot reports, hashing information relating to the mobile message content, etc.) also can be evaluated as desired to facilitate classifying whether the mobile messages are abusive or non-abusive, whether the mobile messages are related to a subscription service or distribution list, etc.

The MADC 116 also can identify and/or classify a mobile message as being a harassing mobile message, which can be another type of abusive mobile message. For instance, a user may receive, via the user's UE (e.g., 102), an undesired mobile message from a UE (e.g., 104) of a mobile message sender who is known or unknown to the user, wherein the mobile message includes something the user finds offensive. The user can or may generate and send an abuse report regarding the received mobile message to the MADC 116, wherein the abuse report can be received by the MADC 116. The MADC 116 can evaluate information contained in the abuse report, the mobile message, etc., and can classify the mobile message as a harassing mobile message. For example, the MADC 116 can evaluate the abuse-report-hash ratio and determine that the ratio value is below the applicable threshold limit for classifying the mobile message as spam, evaluate the abuse-report-sender ratio and determine that such ratio value is not within the applicable threshold limit for classifying the abuse report and associated mobile message as a false positive labeling of abuse, determine that the mobile message sender is not a high-count mobile message sender, and/or evaluate the mobile message content (or representative hash values) and determine that the content can be deemed harassing or offensive to the mobile message recipient, and, based at least in part one or more of the above evaluation results, the MADC 116 can classify the mobile message as a harassing mobile message, in accordance with the predefined message abuse criteria.

In still another aspect, the MADC 116 can classify a mobile message as a virus-containing mobile message, or a phishing mobile message. For example, the MADC 116 can evaluate the mobile message content (or representative hash values) and can compare the content (or hash values) to known virus content or known phishing content, wherein the MADC 116 can retrieve information relating to known virus content and/or known phishing content from a data store. If, based at least in part on the evaluation, the MADC 116 determines that the mobile message contains virus content or phishing content, the MADC 116 can classify the mobile message as an abusive virus-containing mobile message or as an abusive phishing mobile message, respectively, and can execute (e.g., automatically) a desired abuse management action(s) (e.g., block mobile messages from the originating address associated with the mobile message, shutdown of the SIM card and operation of the UE of the abusive mobile message sender, crediting the billing account of the UE user who received the abusive mobile message, etc.) in response to the respective classifications.

In an aspect, if there is more than one evaluation performed and thus, more than one evaluation result (e.g., spam score) to consider in classifying a mobile message, in addition to respective threshold classification levels or ranges of levels, the respective evaluation results can be desirably weighted, adjusted, and/or normalized in relation to each other. For instance, it can be desirable to apply a desired weight factor to a first type of evaluation result or second type of evaluation result to give more weight to the first type of evaluation result over a second type of evaluation result because the first type of evaluation result is known to be a more accurate indicator for classifying the type of mobile message. Additionally or alternatively, it can be desirable to apply a normalization factor to one or the other of the first type of evaluation result or the second type of evaluation result so that the respective evaluation results can be appropriately evaluated together.

As an example of employing more than one type of evaluation to classify a mobile message, there can be a first type of evaluation yielding a first evaluation result that can be compared, by the MADC 116, to an applicable (e.g., applicable for that type of evaluation) first predefined threshold classifier range of values, and a second type of evaluation yielding a second evaluation result that can be compared, by the MADC 116, to an applicable second predefined threshold classifier range of values. Based at least in part on the respective comparisons, the MADC 116 can determine whether the first evaluation result is within the first predefined threshold classifier range of values and whether the second evaluation result is within the second predefined threshold classifier range of values. Based at least in part on the results of those determinations, the MADC 116 can classify the mobile message. For instance, if the first evaluation result is within the first predefined threshold classifier range of values, and such first comparison result indicates that the mobile message is indicative of being abusive spam, but the second evaluation result is not within the second predefined threshold classifier range of values, and such second comparison result indicates that the mobile message is indicative of not being related to a subscription, in accordance with the predefined message abuse criteria, this can indicate that the mobile message is an abusive spam message and the MADC 116 can classify the mobile message as an abusive spam message.

In yet another aspect, if the evaluation results (at least initially) are not conclusive or are ambiguous so as to be able to accurately classify the mobile message, the MADC 116 can execute a desired abuse management action to sideline mobile messages, which are associated with (e.g., sent from) the originating address identified in the abuse report, for a desired amount of time (e.g., one hour, one day, one week, etc.) to facilitate providing the MADC 116 time to collect additional information relating to the mobile message or associated originating address (e.g., the sidelined mobile messages, additional abuse reports associated with the mobile message and/or associated originating address, etc.), or otherwise relating to the abuse report. For instance, an initial evaluation may not provide a sufficiently clear or accurate result due to a number of factors, such as, for example, the time of day the evaluation was performed (e.g., if the mobile message evaluation was performed at night in response to a received abuse report, many other UE users may not yet have seen the mobile message and had the opportunity to send an abuse report regarding the mobile message), the mobile message content may not be sufficiently well known to the MADC 116 and the MADC 116 can desire to collect and evaluate additional information to more accurately classify mobile messages having such mobile message content (e.g., mobile message content may appear to be potential "ham", but also potentially can be content relating to a new spam outbreak, and the MADC 116 can learn, e.g., from the initial and subsequent mobile message evaluations and received abuse reports, whether the content is "ham" or spam and classify mobile messages accordingly), etc. At a desired future time (e.g., an hour later, a day later, a week later, . . . ), the MADC 116 can evaluate (e.g., re-evaluate) the information relating to the abuse report (e.g., the information originally evaluated and information collected since the original evaluation) and can identify or classify whether the mobile message is abusive spam and/or otherwise classify the type of mobile message it is, and identify one or more abuse management actions to execute, based at least in part on the most recently performed evaluation and the predefined message abuse criteria. In an aspect, if the response to the abuse report is delayed, for example, due to re-evaluation at a later time, the MADC 116 can send a mobile message to the UE (e.g., 102) of the complaining UE user and/or the UE (e.g., 104) of the mobile message sender to notify the respective users that the messaging service provider is "investigating" the complaint in the abuse report and a decision will be forthcoming.

In accordance with another aspect, as desired, the MADC 116 can vary or modify predefined threshold ratio levels of respective types of mobile message evaluations in accordance with the predefined message abuse criteria. For example, the MADC 116 can employ more than one predefined maximum threshold number of mobile messages relating to identifying high-count mobile message senders, wherein such respective threshold limits can be selectively applied to different mobile message senders (e.g., a lower threshold limit for new subscribers who are in an introductory subscription period, as compared to the threshold limit applied to a subscriber after the introductory period has passed). In an aspect, the MADC 116 can evaluate whether a current predefined threshold ratio level (e.g., predefined abuse-report-hash ratio value) relating to a particular parameter relating to mobile messaging abuse is at a desired level, can learn in order to identify a more desirable ratio level, and can dynamically implement a desirable learned ratio level as a new predefined threshold ratio level.

In accordance with an aspect, as desired, and in accordance with the predefined message abuse criteria, the MADC 116 can apply a graduated set of predefined threshold ratio levels (and/or predefined threshold reputation values) to facilitate classifying mobile message, wherein, for example, if there are two different threshold ratio levels being applied, a first type or level of mobile messaging evaluation can be performed when an originating address is identified as meeting or exceeding a first, lower threshold ratio level, but being below the second, higher threshold ratio level, and a second type or level of mobile messaging evaluation can be performed when an originating address is identified as meeting or exceeding the second, higher threshold ratio level, wherein the second type or level of evaluation can be more in-depth than the first type or level (e.g., the second type or level can comprise evaluating mobile messaging related information from more resources or over a longer period of time). Also, as desired, different threshold ratio levels can be applied to different subscribers, wherein, for example, a lower threshold ratio level can be applied to new subscribers during an introductory subscription period and a higher threshold ratio level can be applied to regular subscribers after the introductory subscription period has passed. Threshold ratio levels also can be varied or modified based at least in part on time of day, resources available for mobile messaging evaluation, current volume of mobile messaging in the core network 114, etc.

In certain instances, a malicious entity can use a communication device (e.g., UE) to send malware (e.g., spamming malware) to a UE of an innocent and/or unknowing user, wherein the malware is used to configure the UE of the innocent and/or unknowing user to send (e.g., automatically send) abusive mobile messages (e.g., spam) to other UEs, as desired by the malicious entity. This can result in abusive mobile messages being received by other UEs, and can or may result in the innocent and/or unknowing user being charged for the sending of the abusive mobile messages (e.g., if such user has a limited mobile messaging plan or no mobile messaging plan) and/or having mobile messaging services of the innocent and/or unknowing user being suspended or blocked.

In an aspect, the MADC 116 can identify the abusive mobile messages from the infected UE and the originating address of the infected UE, for example, by evaluating the unique ID to overall-mobile-message ratio and/or evaluating other mobile message related information (e.g., historical information or reputation associated with the originating address, abuse reports associated with the originating address, honeypot reports, etc.). The MADC 116 also can drill down into (e.g., perform a more detailed evaluation of) the mobile message related information to determine, for example, whether the user or originating address associated with the infected UE had/has a sufficiently good reputation (at least prior to the current mobile messaging being evaluated) or not, or whether the user or associated originating address had abuse reports (e.g., at least a predefined threshold number of abuse reports) against them (at least prior to the current mobile messaging being evaluated), wherein a good reputation and/or a lack of or a low number of abuse reports can indicate that the user associated with the UE is not or at least may not be intentionally sending the abusive mobile messages via the user's UE.

If the MADC 116 determines that the mobile messages are abusive, but that there is information indicating that the user associated with the originating address is not intentionally sending such messages from the user's UE, the MADC 116 can take (e.g., automatically perform or execute) a desired action(s) (e.g., abuse management action(s)) in response. For example, the MADC 116 can suspend, or at least temporarily suspend, mobile messaging by the user's UE; can contact the user to obtain additional information to be used in determining how to further respond to the abusive mobile messages (e.g., to determine whether the user is an abusive message sender, or whether the user is innocent but has an infected UE) and/or notify the user that the user's UE may be infected with malware; recommend that the user have the UE checked for malware; credit recipients of the abusive mobile messages; credit the user for abusive mobile messages sent by the user's UE, if it is determined that the UE was infected with spamming malware; and/or take other desired responsive action.

In an aspect, referring again to honeypot reports, as desired, the MADC 116 can access honeypot reports to facilitate classifying a mobile message as abusive or not, subscription or distribution-list related, etc. Honeypot reports can be generated in relation to honeypot phones, which are a specified number of phones of a service provider that the service provider does not use in regular service, but rather uses to facilitate identifying abusive mobile message senders and/or abusive callers. Since the honeypot phones are not used in regular service, the honeypot phones typically should not be receiving mobile messages. A honeypot report can comprise information, such as, for example, originating address of a particular mobile message, termination address of the particular mobile message, type of content in the particular mobile message, length of the particular mobile message, whether the particular mobile message contains an URL, time the particular mobile message was sent, etc.

If one or more honeypot phones receives a mobile message from a communication device (e.g., UE 104) associated with an originating address, such mobile messaging can be indicative of abusive mobile messaging. It is understood that a user may misdial and address or otherwise accidentally send a mobile message to an address associated with a honeypot phone. To minimize mistakenly identifying an accidental sending of a mobile message to a honeypot phone as an abusive mobile message, the MADC 116 can evaluate the honeypot reports, which can include information regarding mobile messages and/or calls received by honeypot phones over time (e.g., a specified period of time), and can identify, in the honeypot reports, an inordinate number of mobile messages (e.g., a number of mobile messages that meets or exceeds a predefined maximum number of mobile messages for honeypot phones applicable for the specified period of time) received by honeypot phones from a particular originating address, and/or a pattern of mobile messaging from the originating address to honeypot phones, either of which can indicate that the UE associated with the originating address is or may be sending abusive mobile messages.

In still another aspect, as disclosed supra, the MADC 116 can employ (or another desired component associated with the core network 114 can employ) hashing techniques (e.g., using hashing algorithms) to hash content contained in mobile messages, wherein hashing the message content can provide information, for example, in compressed form, regarding the content of a mobile message and also can provide a level of privacy with regard to message content, since the hash is an abstract representation of the message content, or portion thereof, and is not showing the content itself. One or more of a variety of hashing techniques can be used by the MADC 116 (or the other desired component) to identify or classify the content of mobile messages to facilitate identifying whether a mobile message is abusive or not. The MADC 116 can evaluate the hash values obtained from hashing a mobile message to facilitate classifying the mobile message. For example, the MADC 116 can compare a hash value associated with a mobile message to known spam or known "ham", as more fully disclosed herein, to facilitate classifying the mobile message. As another example, the MADC 116 can identify other mobile messages that contain the same hash value as the mobile message and can evaluate the mobile message and identified mobile messages, as more fully disclosed herein, to facilitate classifying the mobile message and/or the identified mobile messages.

For instance, one hashing technique can scan one or more mobile messages to identify specified keywords (e.g., mortgage, Viagra, refinancing, or other keyword(s) identified as being or deemed to be indicative of spam), which when in a mobile message can be indicative of an abusive mobile message, and the MADC 116 (or the other desired component) can generate, store, and/or evaluate hash information (e.g., hash values, wherein respective hash values can be representative of respective specified keywords or specified keywords in general) that can indicate whether and/or to what extent a mobile message contains one or more of the specified keywords. The MADC 116 (or other desired component) can employ another hashing technique to scan content of a mobile message for URLs, wherein an URL in a mobile message (particularly when one or more of the specified keywords is also in the mobile message) can or may be indicative of an abusive mobile message, and can generate, store, and/or evaluate hashing information that can indicate whether and/or to what extent a mobile message contains one or more URLs and/or identify the destination (e.g., web site) associated with the URL. The MADC 116 (or other desired component) also can utilize a hashing algorithm that scans the color scheme of the mobile message (e.g., color of text, color of URL, color of heading, etc.), as certain color schemes are typically used by spammers, and can generate, store, and/or evaluate hashing information representative or indicative of the color scheme of the mobile message. The MADC 116 (or other desired component) can apply yet another hashing technique that can divide a mobile message into a desired number of subsections and can scan each subsection to determine whether there is content there or blank space, and can generate hashing information (e.g., generate a hash value of 1 when there is content in a subsection, generate a hash value of 0 when there is blank space in a subsection) that can be representative of the content in the mobile message. This hashing algorithm can facilitate identifying mobile messages that contain the same or similar content, which if there are a sufficient number of the same or similar mobile messages, can or may be indicative of abusive mobile messaging. It is to be appreciated and understood that the above-referenced hashing techniques are but a few examples of the hashing techniques that can be utilized in accordance with the subject specification, and that the subject specification can encompass and employ all hashing techniques (e.g., and associated hashing algorithms) to generate hashing information representative of the content of mobile messages.

In an aspect, one or more predefined message abuse rules, which can comprise one or more classification rules, can be generated (e.g., generated by the MADC 116 or another desired component) or selected by a particular UE user (e.g., respective local or manual filters selected by respective UE users), in accordance with the predefined message abuse criteria, and applied to mobile messages by the MADC 116 to facilitate identifying whether a mobile message is abusive to facilitate classifying the mobile message, and if so, what type of abusive message it is; identifying an automated abuse management action(s), if any, that is to be performed in response to an identification or a determination regarding a mobile message (e.g., classification of a mobile message as abusive); blocking of mobile messages, etc. For instance, the global or external message abuse rules (including those rules relating to filtering of mobile messages) desired by the wireless service provider can be applied by the MADC 116 with respect to mobile messaging in the core network 114 in general, and the MADC 116 and/or a particular UE (e.g., 102) can apply other message abuse rules (e.g., filter rules) selected by the particular user of the particular UE.

In still another aspect, the MADC 116 can employ one or more limiters that can limit the number of mobile messages sent from respective UEs in accordance with the predefined message abuse criteria and associated predefined message abuse rules. For example, when wireless service is initially activated for a UE (e.g., 104), the MADC 116 can employ a first limiter (e.g., introductory period limiter) that can be used during an introductory or trial period, which can be for a desired length of time, to limit the number of mobile messages sent by the UE over a predefined period of time (e.g., 1 hour, 1 day, . . . ) to a predefined maximum number of mobile messages (e.g., 15 mobile messages per hour; 50 mobile messages per day) applicable for the introductory period. As desired, the MADC 116 can employ a multi-limiter or more than one limiter to enforce respective limits at the same time, wherein, for example, there can be a hourly limit to the number of mobile messages sent by the UE and a daily limit to the number of mobile messages sent by the UE. The MADC 116 also can employ one or more other limiters (e.g., single limiter, multi-limiter) that can be employed on a regular basis, for instance, with regard to UEs that are no longer in the introductory subscription period, to limit the respective number of mobile messages sent by UEs to a desired predefined maximum threshold number of mobile messages that can be sent for the applicable period(s) of time (e.g., 50 mobile messages per hour; 250 mobile messages per day; . . .

). If more than the applicable threshold limit of mobile messages is sent from the UE during the applicable time period, the MADC 116 can block the mobile messages from being sent, or at least the portion of the mobile messages that exceed the applicable limit, can send a notification to the UE to notify the user that the mobile message limit has been reached and/or whether a mobile message was sent or not, and/or can trigger an evaluation of the mobile message sending for the UE and associated originating address to identify whether the mobile message sending from that UE us abusive or not, wherein a desired action(s), if any, can be taken, in accordance with the predefined message abuse criteria. It is to be appreciated and understood that the threshold mobile messaging limits applied by the limiters can be the same or different from the threshold limits relating to identifying high-count mobile message senders, as desired. For example, a mobile message sender can meet or exceed a high-count threshold limit, while still not exceeding a threshold mobile messaging limit applied by a limiter, when the high-count threshold limit is lower than the threshold mobile messaging limit applied by the limiter.

In an embodiment, the MADC 116 also can provide an automated appeal process to enable an user to appeal action(s) associated with mobile messages that were taken in relation to mobile messaging, for example, when the user believes that an incorrect identification regarding mobile messages associated with the user was made and/or an incorrect responsive action was taken against the user's UE and/or user account. When an action(s) (e.g., identification of a mobile message as abusive (or not abusive), suspending or blocking mobile messaging, denial of credit with regard to a mobile message(s), etc.) is taken with regard to mobile messaging associated with a particular user, and the particular user disagrees with the action(s) taken, the user can use the UE (e.g., 102) or other communication device (e.g., personal computer to access the web site of the wireless service provider) to communicate an appeal regarding the action(s) taken.

The MADC 116 can receive the appeal request from the UE or other communication device of the user, and can process (e.g., automatically process) the appeal of the user. For example, the MADC 116 can automatically perform further evaluation (e.g., a more detailed and precise evaluation) of the information relating to the mobile messaging and/or user, which resulted in the action(s) initially taken (e.g., executed), and/or other information (e.g., information not evaluated by the MADC 116 during the initial evaluation, and/or information submitted by the user as part of the appeal request), than the initial evaluation performed by the MADC 116 that resulted in the action(s) taken, which is the subject of the appeal by the UE user. The MADC 116 can generate (e.g., automatically generate) a response to the appeal of the user based at least in part on the further evaluation of information relating to the mobile messaging and/or the other information, wherein the appeal response can be that the action(s) originally taken was correct or appropriate, or can identify a different action(s) that is to be taken (or should have been taken) by the MADC 116 (or other component) in relation to the mobile messaging associated with the user. For example, if the MADC 116 initially took (e.g., executed) an action to block mobile messaging from the UE of the user because the MADC 116 identified a mobile message(s) from that UE as being abusive based on an initial evaluation the mobile message(s), and the user appeals, the MADC 116 can perform one or more other types of evaluation and/or can evaluate other information, such as historical information associated with the originating address of the UE or user, reputation of the originating address or user, abuse reports (if any) associated with the originating address or user, and/or honeypot reports, etc., to facilitate processing the appeal and determining whether the action(s) initially taken was the correct action(s), and, if such action(s) was not correct, identifying a correct action(s) to take based at least in part on the evaluation performed in processing the appeal, in accordance with the predefined message abuse criteria.

In accordance with various embodiments, the MADC 116 can perform the functions, as disclosed herein, across all or a desired portion of a subscriber base associated with the core network 116, including current network portions and legacy network portions of a communication network. In accordance with various other embodiments, as desired, there can be inter-cooperation between wireless service providers to identify whether a mobile message is abusive or not, and if so, identify or classify the type of abusive message; and identify a desired automated abuse management action(s) to perform in response to the identification or determination made regarding the mobile message. For instance, the MADC 116 associated with one wireless service provider can desirably communicate with one or more MADCs (not shown) respectively associated with other cooperating wireless service providers to uniformly share information (e.g., identified abusive mobile messages and associated originating address information, historical information, reputation information, abuse reports, etc.) and uniformly apply the predefined message abuse rules to mobile messages communicated in the respective communication networks of the respective wireless service providers. As desired, the wireless service providers can respectively protect privacy rights of users (e.g., as legally necessary) when cooperating to share information with each other.

In an embodiment, the MADC 116 can generate abuse reports or other mobile messaging related reports that can be provided to analysts, other wireless service providers, vendors, and/or content providers (e.g., subscription service providers), wherein such reports can be used to facilitate identifying abusive mobile message senders, reducing abusive mobile messaging, maintaining or improving subscription services, etc.

In another aspect, a UE (e.g., 102, 104, 106) can provide an interface with an abusive message button or menu and/or a region where additional information relating to the abuse report can be received so that UE users can generate and transmit an abuse report for a mobile message the user deems abusive, wherein the abuse report can be transmitted from the UE to the MADC 116 for processing by the MADC 116 or other components associated with the core network 114. An abuse report (e.g., abusive mobile message report) of the user also can include other information, such as originating address of the mobile message, termination address of the mobile message, time of the mobile message, etc. The MADC 116 can evaluate the received abuse report to determine whether the mobile message is an abusive message or not in accordance with the predefined message abuse criteria. If the MADC 116 identifies or classifies the mobile message as an abusive message, the MADC 116 can classify the type of abusive message it is, and can implement (e.g., automatically perform) a desired responsive action, as more fully disclosed herein, or take no action, in response to the abusive message report based at least in part on such determination regarding the mobile message, in accordance with the predefined message abuse criteria.

In yet another aspect, a UE, such as UEs 102, 104 and/or 106, can set filters to filter mobile messages to block the receipt of certain undesired mobile messages, wherein the filters can be selected (e.g., manually by the UE user) and employed locally by a UE to locally filter or block undesired mobile messages and/or can be selected and communicated to the MADC 116 wherein the MADC 116 can apply the selected filters to block undesired mobile messages from being sent to the UE. As desired, initially, a UE (e.g., 102) can have no filters set or a set of default filters selected.

For example, a UE (e.g., 102) can block mobile messages based at least in part on the originating address (e.g., block mobile messages from specified UEs), type of content (e.g., block mobile messages having multimedia attached), content rating identifier (e.g., adult content, content suitable for persons 13 and older, content suitable for all ages, etc., wherein mobile messaging that does not meet the selected local filter relating to content rating can be blocked), information contained in the mobile message (e.g., block mobile messages that contain certain terms or phrases (e.g., mortgage, refinance, Viagra, etc.) and/or Uniform Resource Locators (URLs)), and/or other desired filter parameters. When one or more local filters have been set on the UE, the UE can evaluate a received mobile message, prior to notification of the mobile message being provided to the UE user, and can apply the local filters specified by the user (or default local filters) to the mobile message, and can determine whether to block the mobile message or not, in accordance with the filter parameters specified in the local filters. If the mobile message is to be blocked, the UE can discard the mobile message and not provide notification of the mobile message to the user. If the UE determines that the mobile message is not to be blocked, the mobile message can be presented to the user in accordance with presentation criteria specified by the user (e.g., present notification of the received mobile message to the user via the user interface).

In still another aspect, the user can set one or more local filters for the UE (e.g., 102) by accessing a local filter menu on the UE and selecting the desired local filters, or accessing the user account on the web site of the wireless service provider and selecting the desired local filters via a provided interface with a menu of available local filters, wherein the MADC 116 can communicate the desired (e.g., selected) local filters to the UE, and the UE can be configured in accordance with the desired local filters. In an embodiment, if a mobile message is locally blocked by a UE in accordance with the local filters implemented, a signal or message can be automatically or manually sent from the UE to the MADC 116 to convey to the MADC 116 specifics relating to the blocked message and indicate that the mobile message was locally blocked, and the user account associated with the UE can be credited (or not billed) for costs related to the blocked mobile message.

Figure 2:
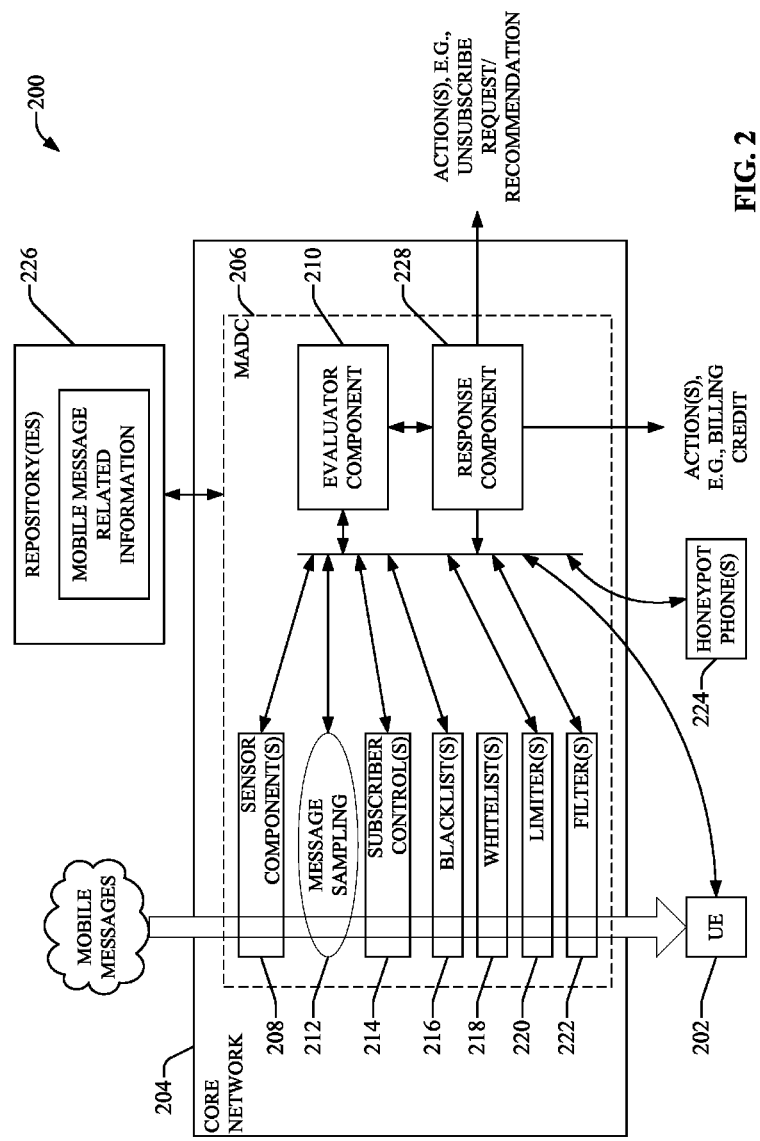
FIG. 2 depicts a block diagram of an example system and data flow that can facilitate classifying mobile messages and associated mobile communication device users in a communication network environment, in accordance with various aspects and embodiments of the disclosed subject matter.

Referring to FIG. 2 (along with FIG. 1), depicted is a block diagram of an example system 200 and data flow that can facilitate classifying mobile messages and associated mobile communication device users in a communication network environment, in accordance with various aspects and embodiments of the disclosed subject matter. The system 200 can comprise one or more UEs, including UE 202, and a core network 204, wherein the core network 204 can include a MADC 206, and the UE 202, core network 204, and MADC 206 each can comprise the same or similar as, or can comprise the same or similar functionality as, respective components (e.g., respectively named or numbered components) such as more fully described herein, for example, with regard to system 100, MADC 300, system 400, etc.

In an aspect, mobile messages (e.g., mobile messages from other UEs (not shown)) can be communicated through the core network 204 to a UE 202. To facilitate identifying or classifying whether a mobile message or subset of mobile messages is/are abusive, what type of mobile message a particular mobile message is, what action(s), if any, to perform in response to identification or classification of a mobile message(s) as abusive or other classifications (e.g., classification of a mobile message(s) as subscription related, classification of a mobile message(s) as "ham", etc.), etc., the MADC 206 can perform one or more desired processes on the mobile message stream, or desired portion thereof, and/or process other information relating to mobile messaging.

The MADC 206 can employ one or more sensor components 208 that can sense or detect a desired portion of mobile messages communicated through the core network 204, and can provide the desired portion of mobile messages and/or information relating to the desired portion of mobile message to an evaluator component 210, which can evaluate the mobile messages and/or other desired information (e.g., historical information, reputation information, abuse reports, honeypot reports, mobile message content or hash information related thereto, etc.) to facilitate identifying whether a mobile message or subset of mobile messages is/are abusive, what type of mobile message a particular mobile message is, what action(s), if any, to perform in response to identification and classification of a mobile message(s) as abusive or other classifications (e.g., classification of a mobile message(s) as subscription related, classification of a mobile message(s) as "ham", etc.), etc. In an aspect, the desired portion of mobile messages can be sensed and/or sampled by random or selective mobile message sampling 212.

In another aspect, the MADC 206 can provide for one or more subscriber controls 214 that can be employed to facilitate identification of abusive mobile messages, abuse reporting, setting and application of subscriber-selected filters to filter or block certain mobile messages, requesting an appeal with regard to action(s) taken by the MADC 206, etc. As desired, the MADC 206 can utilize one or more blacklists 216 that can be used to store addresses (e.g., MSISDNs) as specified by the MADC 206 overall or for respective UE users to globally block mobile messages from blacklisted mobile message senders on a global blacklist of the MADC 206 or block mobile message from blacklisted mobile message senders included on respective blacklists of respective UE users.

In another aspect, the MADC 206 can provide for one or more subscriber controls 214 that can be employed to facilitate identification of trusted senders, or full or partial contents of mobile messages that make them trustworthy, and setting and application of subscriber-selected filters to allow delivery of certain mobile messages, taking precedence over a specified set of some or all of the various blocking action(s) which might otherwise be taken by the MADC 206, etc. As desired, the MADC 206 can utilize one or more whitelists 218 that can be used to store addresses (e.g., MSISDNs) of respective UEs as specified by the MADC 206 overall or for respective UE users to globally allow mobile messages from whitelisted mobile message senders on a global whitelist of the MADC 206 or allow mobile message from whitelisted mobile message senders included on respective whitelists of respective UE users. All or a desired portion of the one or more whitelists 218 also can be stored in, maintained by, and/or updated by the core network 204, and respective whitelists can be stored in, maintained by, and/or updated by respective UEs (e.g., 202).

In still another aspect, the MADC 206 can employ one or more limiters 220 that can be utilized to limit the number of mobile messages sent from a UE over a given period of time to facilitate reducing abusive mobile messages and/or identifying originating addresses associated with abusive mobile message senders. The one or more limiters 220 can include an initial or introductory limiter(s) (e.g., single limiter, multi-limiter) that can enforce an initial, relatively smaller limit(s) on the number of mobile messages that can be transmitted from a UE associated with a new originating address or new wireless service account over a predefined period(s) of time to reduce the ability of an abusive mobile message sender to open a new wireless service account and immediately send a lot of abusive mobile messages.

The one or more limiters 220 also can include a standard limiter(s) (e.g., single limiter, multi-limiter) that can allow more mobile messages to be sent from a UE over a given period of time than the initial filter after a predefined initial or trial period has expired since the subscriber account was opened. Further, as desired, the one or more limiters 220 can comprise other limiters that can reply respective limits on the number of mobile messages based at least in part on type of mobile message, whether the mobile message contains an URL, etc. When the number of mobile messages from an originating address associated with a UE exceeds an applicable limit on the number of mobile messages imposed by the one or more limiters 220, the MADC 206 can perform or take (e.g., automatically) one or more desired actions, including, for example, blocking or not delivering all or a portion of the mobile messages, triggering evaluation of the sent mobile messages to identify whether they are abusive (e.g., spam), quarantining or sidelining the mobile messages for a desired period of time to facilitate evaluation of the mobile messages before deciding whether to send them and/or to use as evidence against an abusive message sender, suspending the sending of mobile messages by the UE associated with the originating address, providing notification to the sending UE of any action(s) taken in response to exceeding the applicable mobile message limit, etc.

In still another aspect, the MADC can employ one or more filters 222 that can filter or block mobile messages that do not meet the filter criteria and associated specified filter parameters for delivering the mobile messages. The one or more filters 222 can comprise one or more network-implemented filters and/or one or more respective subscriber-selected filters, in accordance with the predefined message abuse criteria, such as more fully disclosed herein, wherein selection of the subscriber-selected filters can be facilitated by the one or more subscriber controls 214.

In yet another aspect, the system 200 can comprise one or more honeypot phones 224, such as more fully disclosed herein, wherein the honeypot phones 224 (and/or a component (not shown) associated therewith) can be associated with (e.g., communicatively connected to) the MADC 206, and can generate and communicate honeypot reports to the MADC 206, wherein the honeypot reports can comprise information regarding mobile messages received by the respective honeypot phones 224. The MADC 206 can evaluate the honeypot reports and/or other information relating to mobile messaging to facilitate identifying abusive mobile message senders and desired action(s) to perform in response thereto.

In still another aspect, the system 200 can include one or more repositories 226 that can be associated with (e.g., communicatively connected to, included in) the MADC 206, and can store information, including information relating to mobile messaging. For instance, the one or more repositories 226 can store information, such as historical information of respective originating addresses of UEs and UE users, reputation information of respective originating addresses and UE users, CDRs, abuse reports, reputation of an abuse reporter, information that can facilitate identifying types of mobile messaging abuse, etc. The MADC 206 can access desired information from the one or more repositories 226 to facilitate identifications relating to mobile messages (e.g., abusive mobile message identification, identification of an action(s) to perform in response to an abusive mobile message identification, etc.).

In yet another aspect, the MADC 206 can comprise a response component 228 that can perform or take a desired action(s) (e.g., abuse management action(s)) in response to identification or classification of a mobile message(s), an appeal from a subscriber, etc. For example, when the MADC 206 identifies a mobile message(s) as abusive, the response component 228 can perform a desired action(s) (e.g., blocking the mobile messages from the UE identified as sending abusive mobile messages, providing a billing credit to a recipient of an abusive mobile message, etc.) in response to such identification or classification. As another example, when the MADC 206 determines that a request or recommendation to unsubscribe a subscriber from a subscription to a particular service (e.g., as provided by a third-party service provider) is to be communicated to the particular subscription service provider associated with the particular service, the response component 228 can transmit a request or recommendation to terminate a subscription service to the desired subscription service provider to terminate the subscription for a specified UE user or recommend that the subscription service provider terminate the subscription for the specified UE user or contact the UE user to determine whether the subscription is to be terminated.

The subject specification has a number of advantages over conventional communication systems and methods. For instance, the subject specification, by employing the abuse-report-hash ratio, abuse-report-sender ratio, content correlation evaluation, and unique ID to overall-mobile-message ratio, can facilitate efficiently (e.g., efficient with regard to resources used and computations, cost efficient) identifying and classifying mobile messages and associated mobile message senders accordingly and taking a desired action(s) (e.g., automatically blocking abusive mobile messages, automatically crediting a mobile message recipient who received an abusive mobile message, automatically executing a desired unsubscription action to facilitate unsubscribing a UE user from a subscription service or distribution list, etc.) in response to mobile messages in accordance with their respective classifications, while reducing or minimizing potential countermeasures that may be taken by abusive message senders, as compared to conventional systems and methods. For instance, an abusive message sender may learn of the unique ID to overall-mobile-message ratio and decide that a countermeasure to detection using the ratio would be to send multiple messages to each recipient UE; however, such a countermeasure can be of limited effectiveness as it can increase the probability of subscriber-initiated abuse reports (e.g., a subscriber is more likely to create and send an abuse report when the subscriber receives more than one abusive mobile message than if the subscriber only receives one abusive mobile message) and it can decrease the breadth of the abusive-mobile-message campaign (assuming a fixed sending rate), as the abusive mobile message sender has to use more resources (e.g., UE resources) to send multiple mobile messages to each recipient UE than the amount of resources used to send a single mobile message to each recipient UE, which results in fewer unique recipients receiving the abusive mobile messages over a given period of time, thereby decreasing the breadth of the abusive-mobile-message campaign. Also, the subject specification can evaluate reported abusive mobile messages to determine whether the mobile messages are actually abusive (e.g., spam), and can thereby reduce incorrectly crediting a subscriber's billing account for alleged abusive mobile messages based on false claims to obtain a credit for a subscriber's billing account, which is an improvement over conventional systems and methods. Further, the subject specification, by being able to intelligently and accurately classify mobile messages, is able overcome the shortcomings relating to subscribers reporting mobile messages as abusive or spam wherein many subscribers may not accurately report the mobile message type (e.g., classification), which is an improvement over conventional systems and methods.

Furthermore, in accordance with the subject specification, the classifying of mobile messages and mobile message senders, and identifying action taken in response can be automatic or automated, at least in most instances. Further, processing of abuse reports and appeals relating to mobile messages can be automated in most cases. As a result, the relatively high costs relating to manually handling care calls by the communication service provider can be reduced or minimized through the automation of the abuse reporting, appeal, and crediting processes, while also reducing or minimizing the potential for abuse with regarding to credits for mobile messages, any and all of which are improvements over conventional systems and methods.

The subject specification also improves processing of abuse reports, crediting of subscribers for abusive mobile messages received by subscribers, processing appeals relating to mobile messaging, as compared to conventional systems and methods, in part, by automating respective aspects of the abuse report process, crediting process, and appeal process.

In accordance with an embodiment of the disclosed subject matter, one or more components (e.g., UE, MADC, etc.) in the communication network environment can utilize artificial intelligence (AI) techniques or methods to infer (e.g., reason and draw a conclusion based at least in part on a set of metrics, arguments, or known outcomes in controlled scenarios) whether a mobile message is an abusive message; identify or classify a type of mobile message (e.g., spam, subscriber-related mobile message, "ham", etc.); a type of automated response that should be implemented in response to identification or classification of a mobile message; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the subject innovation can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

Figure 3:
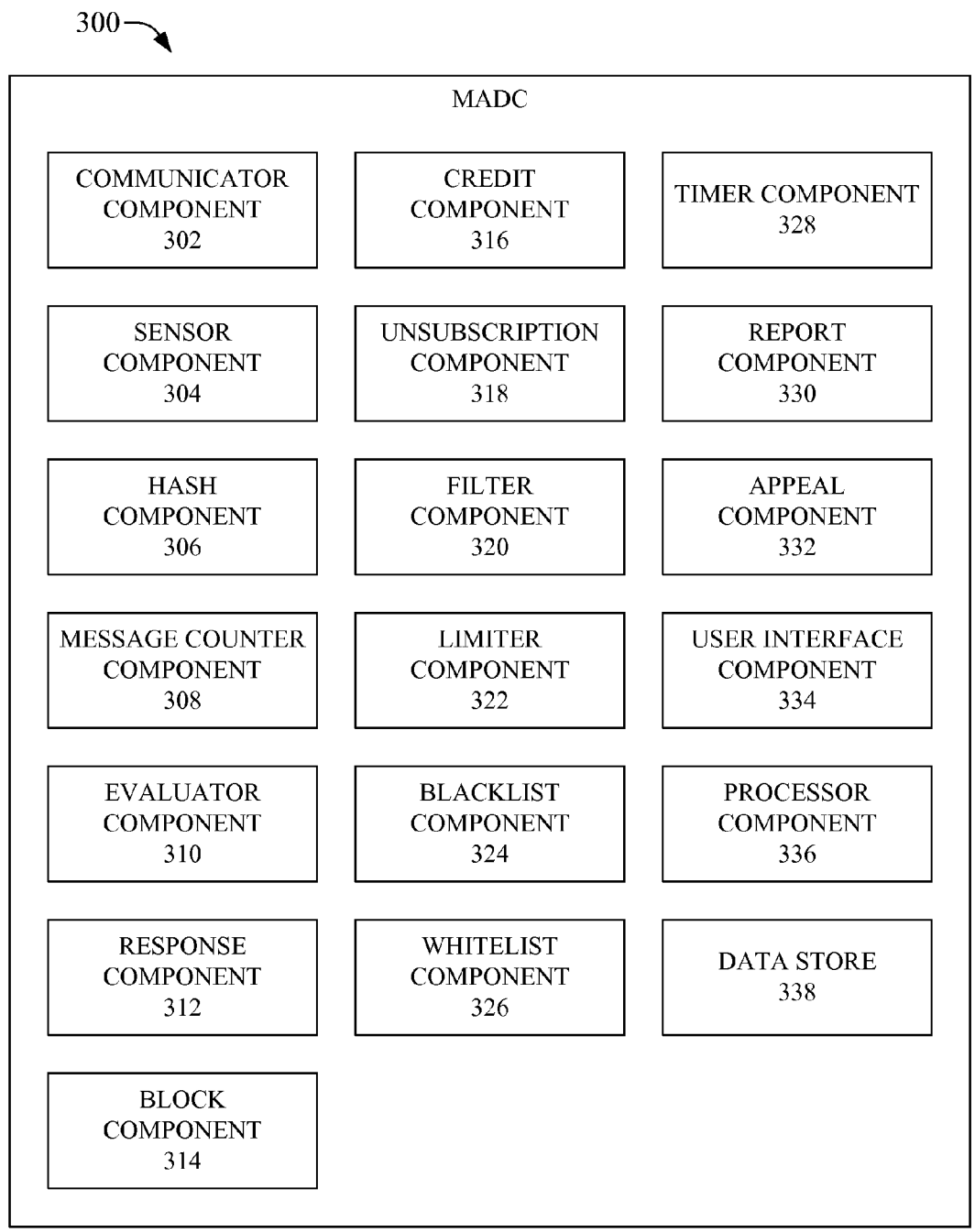
FIG. 3 illustrates a block diagram of an example message abuse detector component (MADC) in accordance with an embodiment of the disclosed subject matter.

FIG. 3 depicts a block diagram of an example MADC 300 in accordance with an embodiment of the disclosed subject matter. In an aspect, the MADC 300 can comprise a communicator component 302 that can be employed to communicate (e.g., transmit, receive) information, including information relating to mobile messages, between the MADC 300 and other components or devices, such as UEs, repositories, honeypot phones, etc.

In an aspect, the MADC 300 can include a sensor component 304 that can sense, detect, and/or sample mobile messages, including information (e.g., metadata, such as originating address associated with the mobile message, termination address associated with the mobile message, type of mobile message, content rating identifier, time of transmission of the mobile message, etc.) related thereto. The sensor component 304 can sense mobile messages randomly or selectively, as desired by the MADC 300, in accordance with the predefined message abuse criteria.

The MADC 300 also can include a hash component 306 that can employ one or more desired hash techniques, such as, for example, those hash techniques more fully disclosed herein, to hash desired mobile messages to generate hash values that respectively represent portions of mobile message content. The hash component 306 apply the desired hash technique(s) to a desired portion of mobile message content and can generate a hash value that can represent (e.g., in an abstract form) the portion of mobile message content. The MADC 300 can utilize the hash values to facilitate evaluating and classifying mobile messages.

In another aspect, the MADC 300 can comprise a message counter component 308 that can perform or track various types of message counting in relation to evaluation of mobile messages by the MADC 300. For example, the message counter component 308 can count or identify the number of mobile messages that include a particular hash value that were sent during a predefined period of time, and can count or identify the number of those mobile messages that have been reported as abusive (e.g., in abuse reports), to facilitate calculating an abuse-report-hash ratio. As another example, the message counter component 308 can count or identify the number of mobile messages sent from an originating address over a predefined period of time, and can count or identify the number of mobile messages reported as abusive (e.g., the number of abuse reports) in relation to the originating address, to facilitate calculating the abuse-report-sender ratio. As still another example, the message counter component 308 can count or identify the total number of mobile messages sent from an originating address during a predefined period of time, and, from those mobile messages, can count or identify the number of unique termination addresses, to facilitate calculating the unique ID to overall-mobile-message ratio.

The MADC 300 can comprise an evaluator component 310 that can analyze or evaluate information, such as mobile messages, associated metadata, associated hash information, historical data associated with UEs or associated users, reputation associated with UEs or associated users, CDRs, abuse reports, honeypot reports, mobile message content or hash information relating thereto, whitelists, blacklists, etc., to facilitate identifying and/or classifying mobile messages as abusive or not, identifying a type of abusive mobile message, identifying a desired action(s) to perform in response to identification or classification of a mobile message(s), etc. The evaluator component 310 can receive hash information from the hash component 306 and/or respective count information from the message counter component 308 to facilitate determining or calculating a desired type of ratio, including an abuse-report-hash ratio, an abuse-report-sender ratio, and/or a unique ID to overall-mobile-message ratio, determining or calculating an amount of content correlation of mobile message content to known spam or known "ham", and/or can receive other mobile message related information (e.g., historical information, reputation information, CDRs, honeypot reports, abuse reports, etc.) from other sources, wherein such received information can be used to facilitate classification of mobile messages as abusive or not, classification of types of mobile messages, and identification of desired responsive action.

The MADC 300 can include a response component 312 that can implement or enforce a desired action(s) based at least in part on the results of the evaluation by the evaluator component 310 and in accordance with the predefined message abuse criteria. For example, the response component 312 can automatically block mobile messages being sent by a UE, or take other desired responsive action, when the UE is identified as sending abusive mobile messages, and/or can credit the accounts of recipients of the abusive mobile messages for costs relating to receiving the abusive mobile messages. The response component 312 also can execute a desired unsubscription action(s) when the mobile message is classified as being related to a subscription service or distribution list and the mobile message sender is identified or classified as being a subscription service provider or distributor.

In accordance with an embodiment, the response component 312 can operate in conjunction with a block component 314 to facilitate, for example, blocking mobile messages sent from an originating address classified as being associated with an abusive mobile message sender. In another embodiment, the response component 312 can operate in conjunction with a credit component 316 to facilitate, for example, crediting an account of a recipient of an abusive mobile message (e.g., spam mobile message) for cost incurred due in part to receiving an abusive mobile message and/or crediting an account of a sender of an abusive mobile message(s) (e.g., spam mobile message) for cost incurred due in part to sending an abusive mobile message(s) when the UE of the sender was infected with malware that caused the communication device to send the abusive mobile messages, without the sender intending the abusive mobile message(s) to be sent. In still another embodiment, the response component 312 can operate in conjunction with an unsubscription component 318 to, for example, execute one or more unsubscription actions, as more fully disclosed herein, to facilitate unsubscribing the recipient of a mobile message (e.g., mobile message that is undesired by the recipient) from a subscription service or distribution list (e.g., in response to an abuse report received from the recipient).

The MADC 300 can contain a filter component 320 that can employ one or more filters to filter or block mobile messages sent from one UE to another UE through the core network. The filters employed by the filter component 320 can include filters desired by the wireless service provider and/or subscriber-selected filters, wherein the subscriber can select desired available filters via the subscriber's UE and/or another communication device (e.g., personal computer used to access the web site of the wireless service provider).

One type of filter can be, for example, a content rating filter that can filter or block a mobile message based at least in part on the selected content rating parameter value (e.g., first parameter value that allows all content; second parameter value that blocks content not suitable for users under 18 years old; third parameter value that blocks content not suitable for users under 13 years old; etc.) and a content rating identifier or MADC-determined content rating classification (e.g., first identifier or classification that indicates content is suitable for all ages; second identifier or classification that indicates that the content is not suitable for users under 18 years old; third identifier or classification that indicates content is not suitable for users under 13 years old; etc.) associated with a mobile message. Another filter type of filter can be a address-specific filter that can block mobile messages (or calls) from a UE associated with a particular address, for example, as desired by a subscriber. Still another filter can be a content filter that can block mobile messages that contain, for example, multimedia or URLs. The above-referenced filters are but a few examples of the filters that can be employed by the filter component 320, and it is to be appreciated and understood that the subject specification is not limited to the above-referenced filters, but can employ virtually any desired filter such as is known in the art, for example.

In still another aspect, the MADC 300 also can comprise a limiter component 322 that can employ one or more limiters (e.g., single limiter, multi-limiter) to limit the number of mobile messages sent by a particular UE over an applicable period of time. For instance, the limiter component 322 can employ one or more initial or introductory limiters that can be used to limit the number of mobile messages sent by a UE of a new subscriber during an introductory period for the new wireless service account, wherein there can be, for example, an hourly limit, a daily limit, an overall limit, and/or another desired limit on the number of mobile messages sent by the UE during the applicable time period (e.g., hour, day, month, etc.) during the introductory period. The limiter component 322 also can employ one or more standard limiters that can limit the number of mobile messages for UEs that are no longer in the introductory period, wherein the mobile message limits of the standard limiter(s) typically can allow for more mobile messages to be sent by a UE for a given applicable time period than the initial limiter(s).

In an embodiment, the MADC 300 optionally can include a blacklist component 324 that can contain one or more blacklists (e.g., global blacklist, blacklists of respective subscribers), wherein, for example, a particular blacklist of a subscriber can include one or more UE addresses that the subscriber desires to have blocked so that the subscriber's UE does not receive mobile messages and/or calls from the blacklisted UE. The blacklist component 324 can facilitate enabling a blacklist to be updated and stored, as desired. The blacklist component 324 can operate in conjunction with the filter component 320 to filter or block undesired mobile messages or calls from UEs associated with UE addresses that are listed on the applicable blacklist.

In an embodiment, the MADC 300 optionally can include a whitelist component 326 that can contain one or more whitelists (e.g., global whitelist, whitelists of respective subscribers), wherein, for example, a particular whitelist of a subscriber can include one or more UE addresses that the subscriber desires to have delivered so that the subscriber's UE receives mobile messages and/or calls which might otherwise be blocked by one or more filter components 320 of MADC 300. The whitelist component 326 can facilitate enabling a whitelist to be updated and stored, as desired. The whitelist component 326 can operate in conjunction with the filter component 320 to bypass one or more types of filtering of messages from UEs associated with UE addresses that are listed on the applicable whitelist.

In an aspect, the MADC 300 can employ a timer component 328 that can track respective amounts of time in relation to respective time periods applicable for respective limiters employed by the limiter component 322. The timer component 328 also can document or indicate (e.g., time stamp) respective times that respective mobile messages are sent by UEs or received by UEs to facilitate evaluation, by the evaluator component 310, of use of mobile messaging by respective UEs.

The MADC 300 can comprise a report component 330 that can facilitate providing mechanisms (e.g., abuse report button, abuse report menu) for creating abuse reports to UEs. The report component 330 also can receive abuse reports and associated information from UEs and can process the abuse reports to facilitate providing desired abuse report information to the evaluator component 310 for evaluation, as desired.

In still another aspect, the MADC 300 can contain an appeal component 332 that can process appeals (e.g., automatically process and respond to appeals) relating to decisions made and/or actions taken by the MADC 300 with regard to mobile messaging. When the MADC 300 takes or performs an action, such as blocking mobile messages, identifying or not identifying mobile messages as abusive, crediting or not crediting a subscriber account in relation mobile messaging costs, etc., if a subscriber believes such action is not correct, the subscriber can use the UE or other communication device to generate and send an appeal to dispute the action taken by the MADC 300. The appeal component 332 can receive the appeal and can automatically facilitate processing the appeal, as the appeal component 332 can provide relevant appeal-related information to the evaluator component 310 and/or other components of the MADC 300 to facilitate processing the appeal (e.g., the evaluator component 310 can perform a more in-depth evaluation of information relating to the mobile messaging that is the subject of the appeal than the evaluation initially performed which resulted in the initial action taken by the MADC 300). The appeal component 332 also can facilitate providing (e.g., automatically providing) a response or decision on the appeal to the subscriber's UE or other desired destination (e.g., subscriber's email address).

In accordance with an embodiment, the MADC 300 optionally can contain an user interface component 334 that can be used to display provide information to an administrator, a technician, or other desired person associated with the wireless service provider to facilitate manual review of information relating to mobile messaging to facilitate evaluation of such information, identification or classification of use of mobile messaging, identifying or initiating a desired responsive action, deciding an appeal, etc., for example, when the MADC 300 is not able to automatically perform a particular function. The user interface component 334 also can receive input of information from the administrator, technician, or other desired person to facilitate accessing desired information, manually taking one or more actions relating to mobile messaging, communicating with a UE, etc. The user interface 334 further can be used to control (e.g., adjust, modify) parameter values (e.g., mobile messaging limits, filter parameters, etc.) for components of the MADC 300.

In yet another aspect, the MADC 300 can comprise a processor component 336 that can work in conjunction with the other components (e.g., communicator component 302, sensor component 304, hash component 306, message counter component 308, evaluator component 310, response component 312, block component 314, credit component 316, unsubscription component 318, filter component 320, limiter component 322, (optional) blacklist component 324, (optional) whitelist component 326, timer component 328, report component 330, appeal component 332, (optional) user interface component 334, etc.) to facilitate performing the various functions of the MADC 300. The processor component 336 can employ one or more processors, microprocessors, or controllers that can process data, such as information relating to mobile messaging by UEs in the core network, information relating to operations of the MADC 300, and/or other information, etc., to facilitate operation of the MADC 300, as more fully disclosed herein, and control data flow between the MADC 300 and other components (e.g., UE, other components in the core network, etc.) associated with the MADC 300.

The MADC 300 also can include a data store 338 that can store data structures (e.g., user data, metadata); code structure(s) (e.g., modules, objects, hashes, classes, procedures) or instructions; information relating to mobile messaging associated with UEs operating in the core network, information relating to operations of the MADC 300, whitelist information, blacklist information, predefined message abuse criteria (and associated predefined message abuse rules), predefined message routing rules, etc., to facilitate controlling operations associated with the MADC 300, etc. In an aspect, the processor component 336 can be functionally coupled (e.g., through a memory bus) to the data store 338 in order to store and retrieve information desired to operate and/or confer functionality, at least in part, to the communicator component 302, sensor component 304, hash component 306, message counter component 308, evaluator component 310, response component 312, block component 314, credit component 316, unsubscription component 318, filter component 320, limiter component 322, (optional) blacklist component 324, (optional) whitelist component 326, timer component 328, report component 330, appeal component 332, (optional) user interface component 334, and/or substantially any other operational aspects of the MADC 300.

Figure 4:
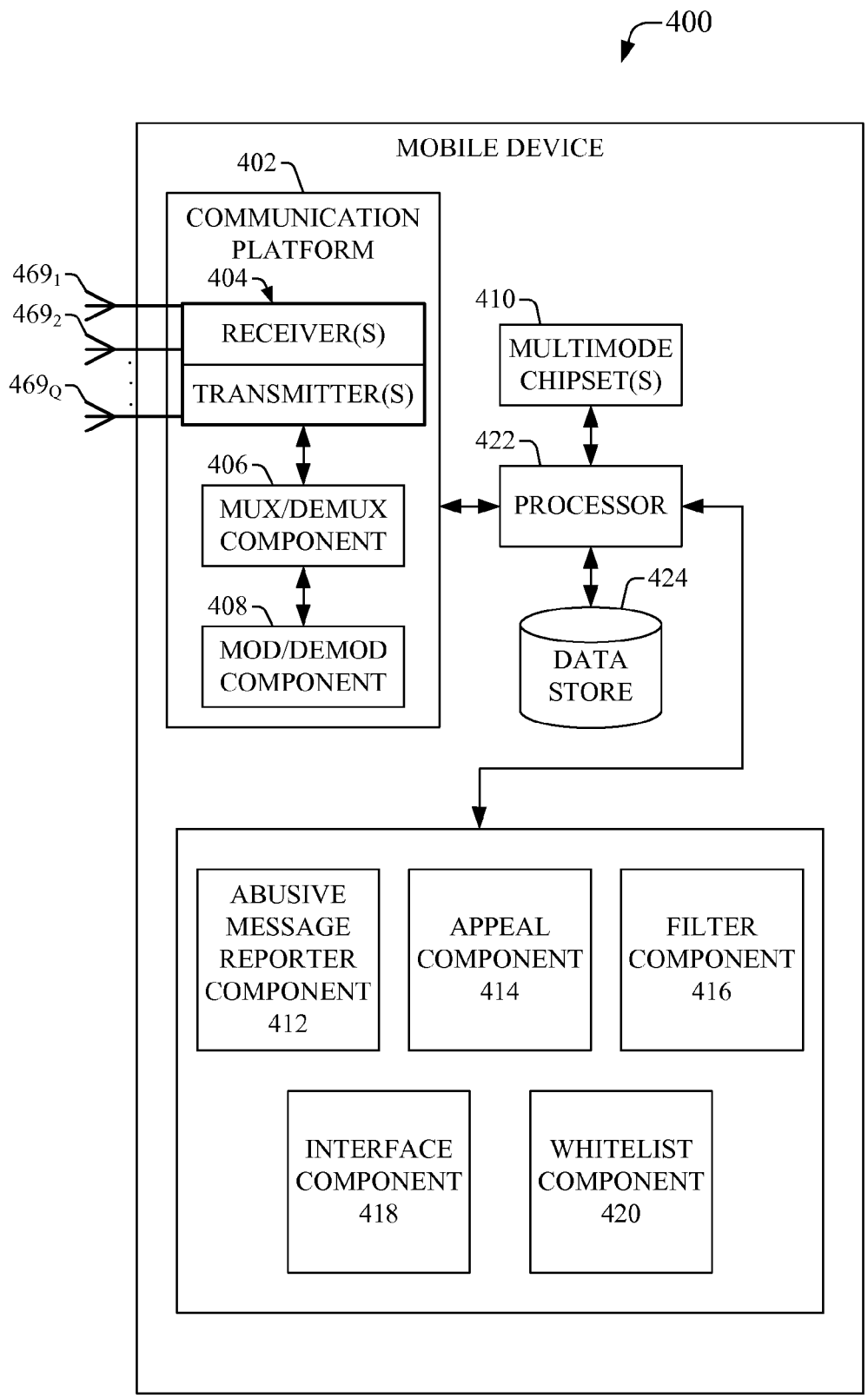
FIG. 4 depicts a block diagram of an example mobile device in accordance with an aspect of the disclosed subject matter.

FIG. 4 depicts a block diagram of an example mobile device 400 (e.g., UE) in accordance with an aspect of the disclosed subject matter. In an aspect, the mobile device 400 can be a multimode access terminal, wherein a set of antennas $469_1$-$469_Q$ (Q is a positive integer) can receive and transmit signal(s) from and to wireless devices like access points, access terminals, wireless ports and routers, and so forth, that operate in a radio access network. It should be appreciated that antennas $469_1$-$469_Q$ are a part of communication platform 402, which comprises electronic components and associated circuitry that provide for processing and manipulation of received signal(s) and signal(s) to be transmitted; e.g., receivers and transmitters 404, multiplexer/demultiplexer (mux/demux) component 406, and modulation/demodulation (mod/demod) component 408.

In another aspect, the mobile device 400 can include a multimode operation chipset(s) 410 that can allow the mobile device 400 to operate in multiple communication modes in accordance with disparate technical specification for wireless technologies. In an aspect, multimode operation chipset(s)

410 can utilize communication platform 402 in accordance with a specific mode of operation (e.g., voice, GPS). In another aspect, multimode operation chipset(s) 410 can be scheduled to operate concurrently (e.g., when Q>1) in various modes or within a multitask paradigm.

In still another aspect, the mobile device 400 can comprise an abusive message reporter component 412 that can receive information from an user of the mobile device 400 relating to mobile messaging. For instance, the abusive message reporter component 412 can facilitate providing, via an interface, an abusive mobile message button or menu and/or a region where additional information relating to the abuse report can be received so that the user can generate an abuse report for a mobile message the user deems abusive. The abusive message reporter component 412 also can facilitate communicating the abuse report from the mobile device 400 to the MADC for processing. An abuse report (e.g., abusive mobile message report) of the user also can include other information, such as originating address of the mobile message, termination address of the mobile message, time of the mobile message, etc.

In yet another aspect, the mobile device 400 also can contain an appeal component 414 that can facilitate appealing a decision or action taken by the MADC or associated wireless service provider with regard to mobile messaging or other services provided by the wireless service provider, wherein the MADC can automatically process the appeal. The appeal component 414 can facilitate providing, via an interface, an appeal button or menu and/or a region where additional information relating to the appeal can be received so that the user can generate the appeal and transmit it to the MADC for processing. The appeal component 414 also can be employed to facilitate receiving (e.g., automatically receiving) and presenting a response to the appeal from the MADC. In another aspect, as desired, the appeal component 414 can be accessed via a web site (e.g., web site of the wireless service provider) and/or a phone-based control panel.

In an aspect, the mobile device 400 can include a filter component 416 that can employ one or more filters locally on the mobile device 400 or facilitate of selection and implementation of one or more filters by the MADC to filter undesired mobile messages based at least in part on type of filter(s) employed. The filters can be an address filter that can block mobile messages or calls from specified UE addresses. In an embodiment, when desired, a blacklist (not shown) optionally can be used in conjunction with the address filter to facilitate blocking mobile messages or calls from the UE addresses specified in the blacklist, wherein the address filter can use the UE addresses specified in the blacklist to identify the UE addresses for which mobile messaging is to be blocked. Other types of filters can include, for example, content filters, content rating filters, etc.

When employing local filters on the mobile device 400, the filter component 416 can evaluate a received mobile message, prior to notification of the mobile message being provided to the mobile device user, and can apply the filters specified by the user (or default filters) to the mobile message, and can determine whether to block the mobile message or not. If the mobile message is to be blocked, the filter component 416 can discard the mobile message and not provide notification of the mobile message to the user; and if the filter component 416 determines that the mobile message is not to be blocked, the mobile message can be presented to the user in accordance with the presentation criteria specified by the user (e.g., present notification of the received mobile message to the user via a desired interface).

The mobile device 400 can contain an interface component 418 that can comprise one or more interfaces (e.g., display screens, touch screens, buttons, controls, switches, adapters, connectors, speakers, etc.) that can be utilized to facilitate presentation of information to a mobile device user or receiving data input from a mobile device user. In an aspect, the interface component 418 can present mobile messages or information related to mobile messages to the mobile device user. For example, the interface component 418 can operate in conjunction with the abusive message reporter component 412 or the appeal component 414 to facilitate presentation of buttons, controls, or menus to facilitate generating and sending an abuse report, or generating and sending an appeal, to the MADC. As another example, the interface component 418 can operate in conjunction with the filter component 416 to set or employ desired filters locally on the mobile device 400 and/or at the MADC. In an aspect, the interface can receive input, via manipulation of buttons, controls, or menus by the mobile device user to facilitate setting one or more desired filters for the mobile device 400, and the mobile device can be configured in accordance with the desired filters, when the filters are local filters. In an embodiment, if a mobile message is locally blocked by the mobile device 400 in accordance with the local filters implemented, the interface component 418 can facilitate automatic or manual transmission of a signal or message from the mobile device 400 to the MADC to convey to the MADC that the mobile message was locally blocked, and the user account associated with the mobile device 400 can or may be credited (or not billed) for costs related to the blocked mobile message, in accordance with the predefined message abuse criteria.

In an embodiment, the mobile device 400 optionally can include a whitelist component 420 that can generate, maintain, and/or update a whitelist that can be used to store addresses (e.g., MSISDNs) of respective UEs, as specified, for example, by the mobile device user, to allow mobile messages from whitelisted mobile message senders on the whitelist. In an aspect, all or a desired portion of the whitelist also can be stored in, maintained by, updated by, and/or synchronized with respective whitelists stored in the core network and/or MADC. In another aspect, as desired, adding an address of a UE to the whitelist associated with the mobile device 400 can enable the mobile device 400 to receive mobile messages or calls from the added address, even if mobile messages or calls from the address would otherwise have been filtered by a filter activated by the mobile device 400 or MADC. Also, during an evaluation of a mobile message associated with an originating address, an MADC can evaluate the addresses and other information contained in the whitelist of the mobile device 400 to facilitate classifying the mobile message (e.g., an originating address being on the whitelist of the mobile device 400 can be indicative of the mobile message not being an abusive mobile message at least in relation to the mobile device 400).

In still another aspect, the mobile device 400 also can include a processor(s) 420 that can be configured to confer functionality, at least in part, to substantially any electronic component within the mobile device 400, in accordance with aspects of the subject innovation. For example, the processor(s) 420 can facilitate enabling the mobile device 400 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 420 can facilitate enabling the mobile device 400 to process data relating to mobile messaging, voice calls, or other services (e.g., Internet services or access, services related to applications, etc.).

The mobile device 400 also can contain a data store 422 that can store data structures (e.g., user data, metadata); code structure(s) (e.g., modules, objects, classes, procedures) or instructions; message hashes; neighbor cell list; whitelist; blacklist; information relating to mobile messaging, voice calls, or other services; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 420 can be functionally coupled (e.g., through a memory bus) to the data store 422 in order to store and retrieve information (e.g., neighbor cell list; information relating to mobile messaging, voice calls, or other services; frequency offsets; desired algorithms; etc.) desired to operate and/or confer functionality, at least in part, to communication platform 402, multimode operation chipset(s) 410, abusive message reporter component 412, appeal component 414, filter component 416, and interface component 418, and/or substantially any other operational aspects of the mobile device 400.

Figures 5A, 5B, 5C:
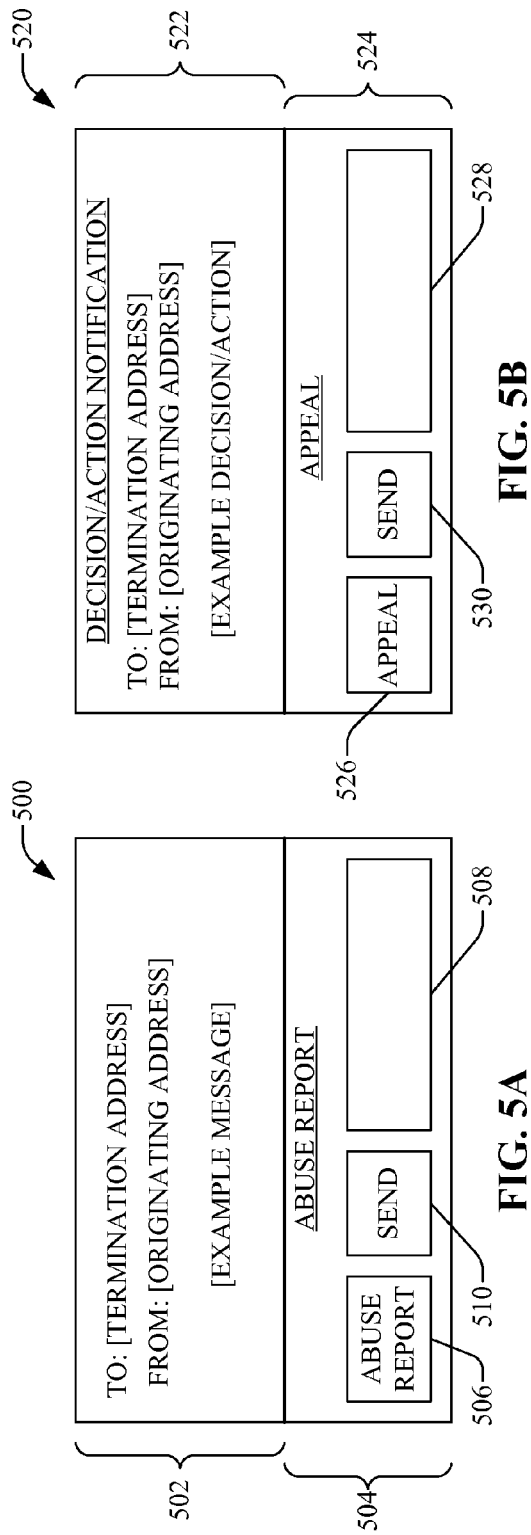
FIGS. 5A, 5B, and 5C illustrate diagrams of example interface displays in accordance with various embodiments of the disclosed subject matter.

FIGS. 5A, 5B, and 5C illustrate example interface displays in accordance with embodiments of the disclosed subject matter. The UE (e.g., mobile device) can facilitate presentation of the interface displays, and associated buttons, controls, or menus, for example, using an interface component, such as more fully described herein with regard to mobile device 400. FIG. 5A depicts an example interface display 500 that can facilitate presenting a UE user with the option of generating an abuse report relating to a received mobile message. The interface display 500 can include a message region 502 that can present (e.g., display) a received mobile message or a mobile message being composed by the UE user. For a received mobile message, the interface display 500 also can include an abuse report region 504 wherein an abuse report can be initiated, generated, and transmitted. The UE user can initiate an abuse report by entering input (e.g., selecting a button on a keypad or touch screen) that selects a control to initiate an abuse report. For example, the UE user can select the "abuse report" control 506 on the interface display 500 (e.g., when the interface display 500 is also a touch screen) to initiate the abuse report. The abuse report region 504 optionally can comprise an abuse information region 508 wherein the UE can receive information from the user via the interface component that can be inserted in the abuse information region 508 to provide the MADC with additional information regarding the mobile message being reported as abusive. Additionally, or alternatively, the abuse information region 508 can include available selections of predefined information (e.g., spam selection, harassing message selection, etc.) that the UE user can select in order to provide reasons or additional information relating to the abuse report. The abuse report region 504 also can include a send control 510 that can be manipulated and/or selected by the UE user to send the abuse report to the MADC for processing by the MADC.

FIG. 5B illustrates an example interface display 520 that can facilitate presenting a UE user with the option of generating and sending an appeal relating to a decision or action taken by the MADC or associated wireless service provider with regard to a mobile message(s) sent or received by the UE user. The interface display 520 can include a message region 522 that can present (e.g., display) a received message, for example, from the MADC, regarding a decision and/or action taken by the MADC and/or wireless service provider. The interface display 520 also can include an appeal region 524 wherein an appeal can be initiated, generated, and transmitted. The UE user can initiate an appeal by entering input (e.g., selecting a button on a keypad or touch screen) that selects a control to initiate the appeal. For example, the UE user can select or touch the "appeal" control 526 on the interface display 520 (e.g., when the interface display 520 is also a touch screen) to initiate the appeal. The appeal region 524 optionally can comprise an appeal information region 528 wherein the UE can receive information from the user via the interface component that can be inserted in the appeal information region 528 to provide the MADC with additional information regarding the appeal (e.g., reasons for the appeal). Additionally, or alternatively, the appeal information region 528 can include available selections of predefined information (e.g., "I should have received a credit", "My mobile messaging should not have been suspended", etc.) that the UE user can select in order to provide reasons or additional information relating to the appeal. The appeal region 524 also can include a "send" control 530 that can be manipulated and/or selected by the UE user to send the appeal to the MADC for processing by the MADC.

FIG. 5C illustrates an example interface display 540 that can facilitate presenting a UE user with the available filters for selection, as desired, by a UE user. In an aspect, the interface display 540 can comprise one or more filter controls, such as, for example, content rating filter control 542, a content filter control 544, an address-specific filter control 546, and/or other filter(s) control 548, wherein the user can select one or more of the desired filter controls to select one or more the desired corresponding filters to filter mobile messages being sent to the UE locally on the UE and/or by the MADC. When the UE user has selected the desired filters, the "save changes" control 550 can be selected by the UE user to save the desired filter settings and facilitate configuring the UE to implement the selected filters and/or transmit information relating to the selected filters to the MADC. When the filter is a local filter, selection of the local filter (when the selection is a saved change) can initiate configuration of the UE to use the selected local filter. When the filter is one that is implemented by the MADC, the UE can transmit information relating to the selected filters to the MADC, wherein the MADC can be configured to implement the selected filters and filter mobile messages in accordance with the selected filters.

Figure 6:
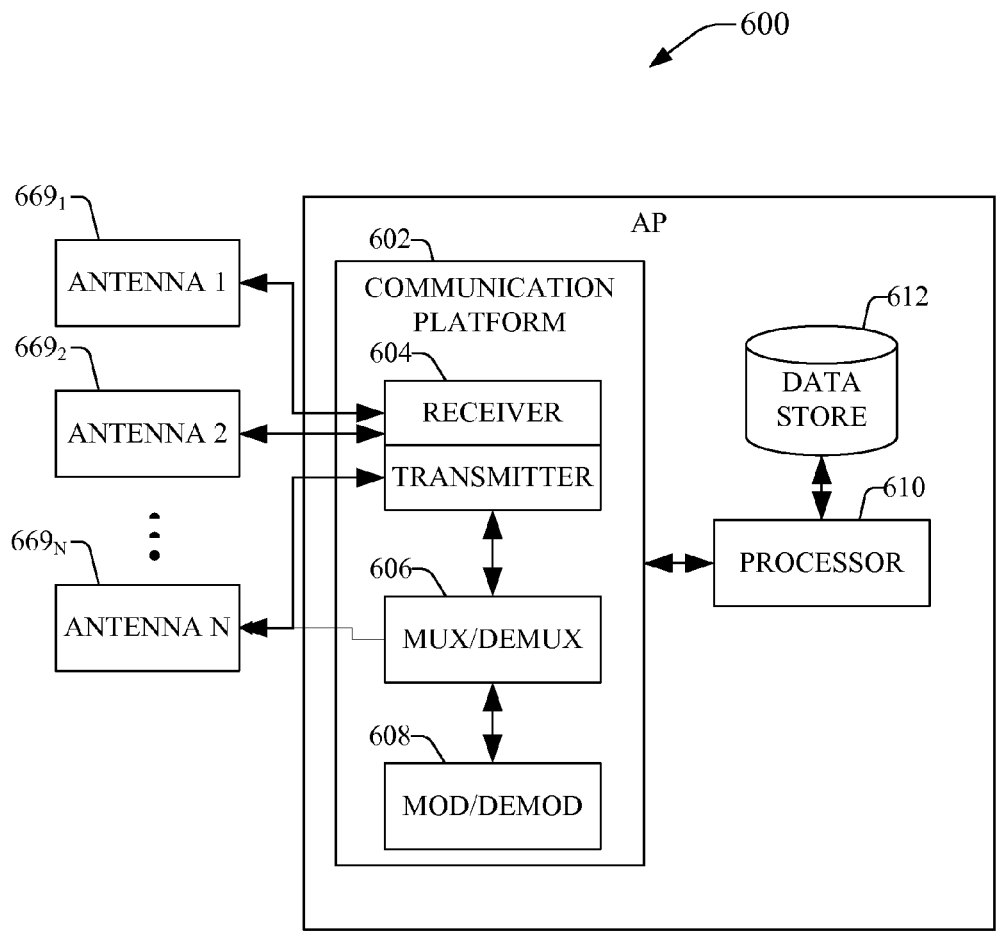
FIG. 6 illustrates a block diagram of an example access point (AP) in accordance with an aspect of the disclosed subject matter.

FIG. 6 illustrates a block diagram of an example AP 600 (e.g., femtocell, picocell, base station, etc.) in accordance with an aspect of the disclosed subject matter. The AP 600 can receive and transmit signal(s) from and to wireless devices like access points (e.g., femtocells, picocells, base stations, etc.), access terminals (e.g., UEs), wireless ports and routers, and the like, through a set of antennas $669_1$-$669_N$. In an aspect, the antennas $669_1$-$669_N$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), with M a positive integer), phase-shift keying (PSK), and the like.

The AP 600 also can comprise a processor(s) 610 that can be configured to confer and/or facilitate providing functionality, at least partially, to substantially any electronic component in or associated with the AP 600. For instance, the processor(s) 610 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 610 also can facilitate other operations on data to facilitate managing or maintaining a white list that includes information, such as communication device identifiers associated with communication devices that can connect to the AP 600 to communicate voice or data, etc.

In another aspect, the AP 600 can include a data store 612 that can store data structures; code instructions; rate coding information; information relating to measurement of radio link quality or reception of information related thereto; information relating to establishing a communications connection between a UE and other communication device, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 610 can be coupled to the data store 612 in order to store and retrieve information (e.g., information, such as algorithms, relating to multiplexing/demultiplexing or modulation/demodulation, information relating to radio link levels, information relating to establishing communication connections associated with a UE(s) served by the AP 600, information relating to the white list, etc.) desired to operate and/or confer functionality to the communication platform 602, and/or other operational components of AP 600.

In view of the example systems described herein, example methodologies that can be implemented in accordance with the disclosed subject matter can be better appreciated with reference to flowcharts in FIGS. 7-13. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 7:
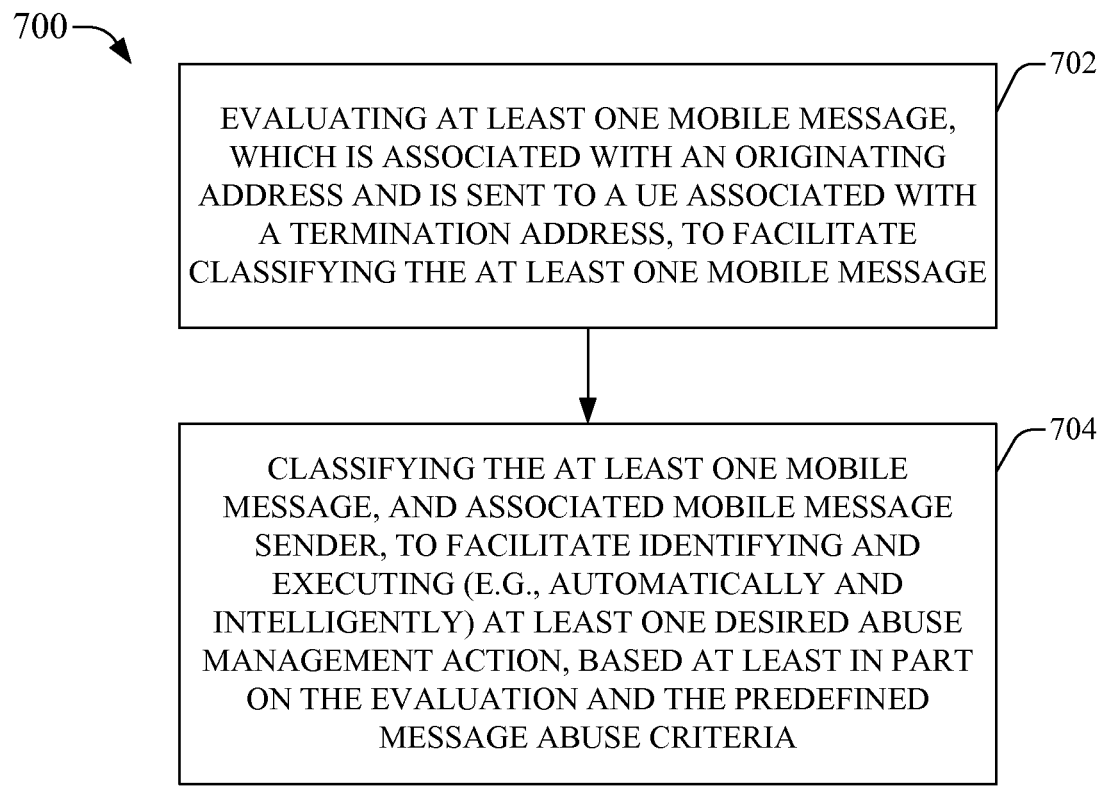
FIG. 7 illustrates a flowchart of an example methodology that can classify mobile messages in accordance with various aspects and embodiments of the disclosed subject matter.

FIG. 7 presents a flowchart of an example methodology 700 that can identify or classify mobile messages and mobile message senders in accordance with various aspects and embodiments of the disclosed subject matter. At 702, at least one mobile message, which is associated with an originating address and is sent to a UE associated with a termination address, can be evaluated to facilitate classifying the at least one mobile message. The MADC can perform one or more types of evaluations on the at least one mobile message, wherein the one or more evaluations can comprise, for example, calculating and evaluating an abuse-report-hash ratio, calculating and evaluating an abuse-report-sender ratio, evaluating content correlation, evaluating the reputation of the mobile message sender, evaluating the reputation of the abuse report sender, calculating and evaluating a unique ID to overall-mobile-message ratio, evaluating to determine whether the originating address is a short code or long code, and/or performing other desired types of evaluations, as more fully disclosed herein.

At 704, the at least one mobile message, and associated mobile message sender, can be classified to facilitate identifying and executing (e.g., automatically and intelligently) at least one desired abuse management action, based at least in part on the evaluation and the predefined message abuse criteria. In an aspect, the MADC can classify the at least one mobile message and associated originating address, which is associated with the mobile message sender, based at least in part on the evaluation result and in accordance with the predefined message abuse criteria. Based at least in part on the classification assigned to the at least one mobile message and associated mobile message sender, the MADC can identify, select, and execute one or more desired abuse management actions (e.g., automatically block mobile messages associated with the originating address, automatically credit the account of the mobile message recipient for cost incurred in relation to receiving the at least one mobile message, automatically executing an unsubscription action(s), etc.), such as those more fully disclosed herein.

Figure 8:
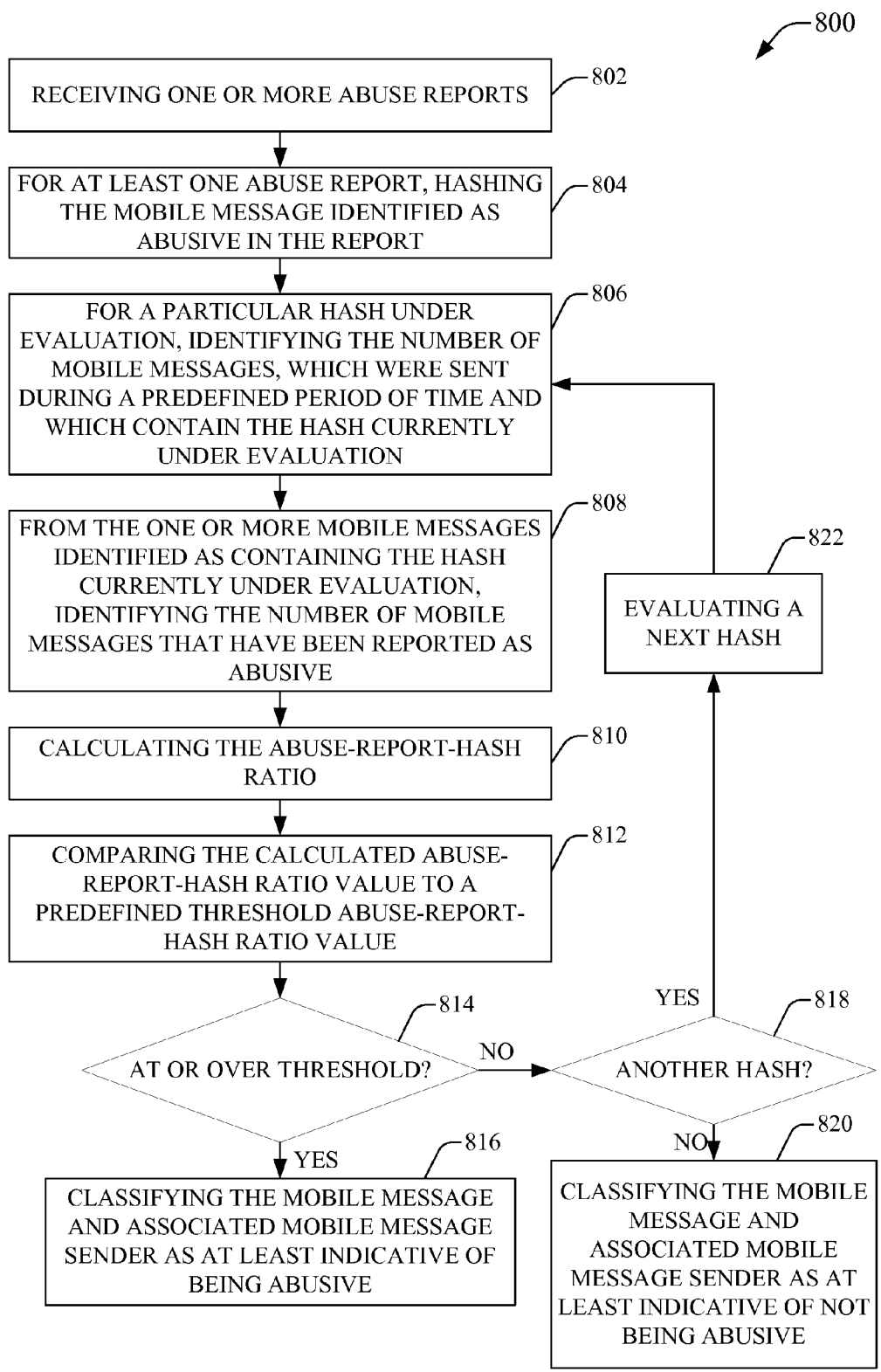
FIG. 8 depicts a flowchart of an example methodology that can calculate or determine an abuse-report-hash ratio to facilitate identifying and classifying mobile messages in accordance with another aspect of the disclosed subject matter.

FIG. 8 illustrates a flowchart of an example methodology 800 that can calculate or determine an abuse-report-hash ratio to facilitate identifying and classifying mobile messages in accordance with another aspect of the disclosed subject matter. At 802, one or more abuse reports can be received, for example, by the MADC, in relation to one or more mobile messages received by UEs in the core network. A UE user who receives a mobile message on the user's UE and who believes (whether correctly or incorrectly) the mobile message is abusive spam, can initiate and generate an abuse report wherein the UE user can label the mobile message as abusive, and can transmit the abuse report to the MADC, which can receive the abuse report for processing.

At 804, for at least one received abuse report (e.g., each abuse report, or desired selected abuse reports), the mobile message can be hashed, for example, using one or more desired hashing techniques, such as more fully disclosed herein. In an aspect, the MADC can hash the content of the mobile message using a desired hash technique(s) (e.g., employing a desired hash algorithm(s)), to obtain one or more hash values that can be representative of one or more portions of the mobile message content.

At 806, for each hash (e.g., hash value) (or at least for a desired number of hashes) obtained from the hashing of the mobile message, the number of mobile messages, which were sent during a predefined period of time and which contain the hash currently under evaluation, can be identified. For instance, mobile messages (e.g., including the mobile message associated with the abuse report), which were transmitted in the core network during a predefined period of time (e.g., predefined time window), can be analyzed or evaluated to identify the number of mobile messages that include the hash currently under evaluation, wherein the predefined period of time can be selected based at least in part on the time of mobile message was sent to the UE that sent the abuse report and/or the predefined message abuse criteria.

At 808, for each desired hash, from the one or more mobile messages identified as containing the hash currently under evaluation, the number of mobile messages that have been reported as abusive, that is, for instance, the number of mobile messages identified as abusive in abuse reports, can be identified. At 810, for each desired hash, the ratio of the number of mobile messages reported as abusive to the overall number of mobile messages sent during the predefined period of time (also referred to herein as the abuse-report-hash ratio) can be calculated or determined to obtain (e.g., generate) an abuse-report-hash ratio value. At 812, the calculated abuse-report-hash ratio value can be compared to a predefined threshold abuse-report-hash ratio value. In an aspect, the predefined threshold abuse-report-hash ratio value can provide at least an indication (e.g., when the calculated abuse-report-hash ratio value is at or over the predefined threshold abuse-report-hash ratio value) that a mobile message reported as abusive is abusive spam, in accordance with the predefined message abuse criteria.

At 814, a determination can be made regarding whether the calculated abuse-report-hash ratio value is at or over the predefined threshold abuse-report-hash ratio value. If it is determined that the calculated abuse-report-hash ratio value is at or over the predefined threshold abuse-report-hash ratio value, at 816, the mobile message under evaluation (e.g., identified in the abuse report) can be classified as abusive spam or at least as being indicative of abusive spam and the mobile message sender can be classified as an abusive message sender or at least as indicative of being an abusive mobile message sender. In such instance, if the mobile message is classified as abusive spam, the MADC can select and execute a desired abuse management action(s) (e.g., automatically credit the account associated with the subscriber that reported the abusive spam mobile message, block the abusive mobile message sender, etc.) in response to that spam classification. If the mobile message is identified or classified as being indicative of abusive spam, but not conclusively classified as abusive spam, as desired, the MADC can, for example, perform further evaluation of mobile messages sent from the originating address that sent the mobile message identified in the abuse report to facilitate identifying the mobile message as abusive spam or not, or identify as another type of mobile message (e.g., subscription-related mobile message, "ham" mobile message, etc.), can sideline mobile messages associated with the originating address until further evaluation is completed, notify the reporting subscriber of the result of the investigation/evaluation of the mobile message identified in the abuse report, or notify the reporting subscriber that the abuse report is still under investigation, etc.

If, at 814, it is determined that the calculated abuse-report-hash ratio value is below the predefined threshold abuse-report-hash ratio value, at 818, a determination can be made regarding whether there is another hash to be evaluated with regard to the mobile message under evaluation. If it is determined that there is no other hash to be evaluated, at 820, the mobile message identified in the abuse report under evaluation can be identified or classified as not being abusive spam or at least indicative of not being abusive spam and the mobile message sender can be classified as not being an abusive mobile message sender or at least as being indicative of not being an abusive mobile message sender. If the mobile message is classified as not being abusive spam, a desired abuse management action(s) can be executed by the MADC, wherein such action(s) can be, for example, deciding that no credit is to be given to the subscriber who reported the mobile message as abusive, notifying the reporting subscriber of the results of the evaluation/investigation of the abuse report and action(s) taken. If the mobile message is classified as indicative of not being abusive spam, but not conclusively classified as being not abusive, the MADC can, for example, perform further evaluation of mobile messages sent from the originating address that sent the mobile message identified in the abuse report to facilitate classifying the mobile message as abusive spam or not, or classify the mobile message as another type of mobile message (e.g., subscription-related mobile message, "ham" mobile message, etc.), can sideline mobile messages associated with the originating address until further evaluation is completed, notify the reporting subscriber of the result of the investigation/evaluation of the mobile message identified in the abuse report, or notify the reporting subscriber that the abuse report is still under investigation, etc.

If, at 818, it is determined that there is another hash to be evaluated with regard to the mobile message under evaluation, at 822, a next hash associated with the mobile message can be evaluated, and methodology 800 can proceed to act 806, wherein methodology 800 can proceed to identify the number of mobile messages, which were sent during the predefined period of time and which contain the hash currently under evaluation, and can continue from that point.

It is to be appreciated and understood that, in accordance with another embodiment, methodology 800 can employ more than one predefined threshold abuse-report-hash ratio value (e.g., respective threshold ranges for the abuse-report-hash ratio), wherein, for example, a first predefined threshold abuse-report-hash ratio value and a second predefined threshold abuse-report-hash ratio value can be employed, wherein the first predefined threshold abuse-report-hash ratio value can be a lower ratio value than the ratio value of the second predefined threshold abuse-report-hash ratio value. If, for a hash value associated with a mobile message under evaluation, a calculated abuse-report-hash ratio value is over the first predefined threshold abuse-report-hash ratio value, but not the second predefined threshold abuse-report-hash ratio value, the mobile message can be classified as being indicative of being an abusive spam mobile message. If, for a hash value associated with a mobile message under evaluation, a calculated abuse-report hash-ratio value is over the first predefined threshold abuse-report-hash ratio value and the second predefined threshold abuse-report-hash ratio value, the mobile message can be classified as being an abusive spam mobile message.

Figure 9:
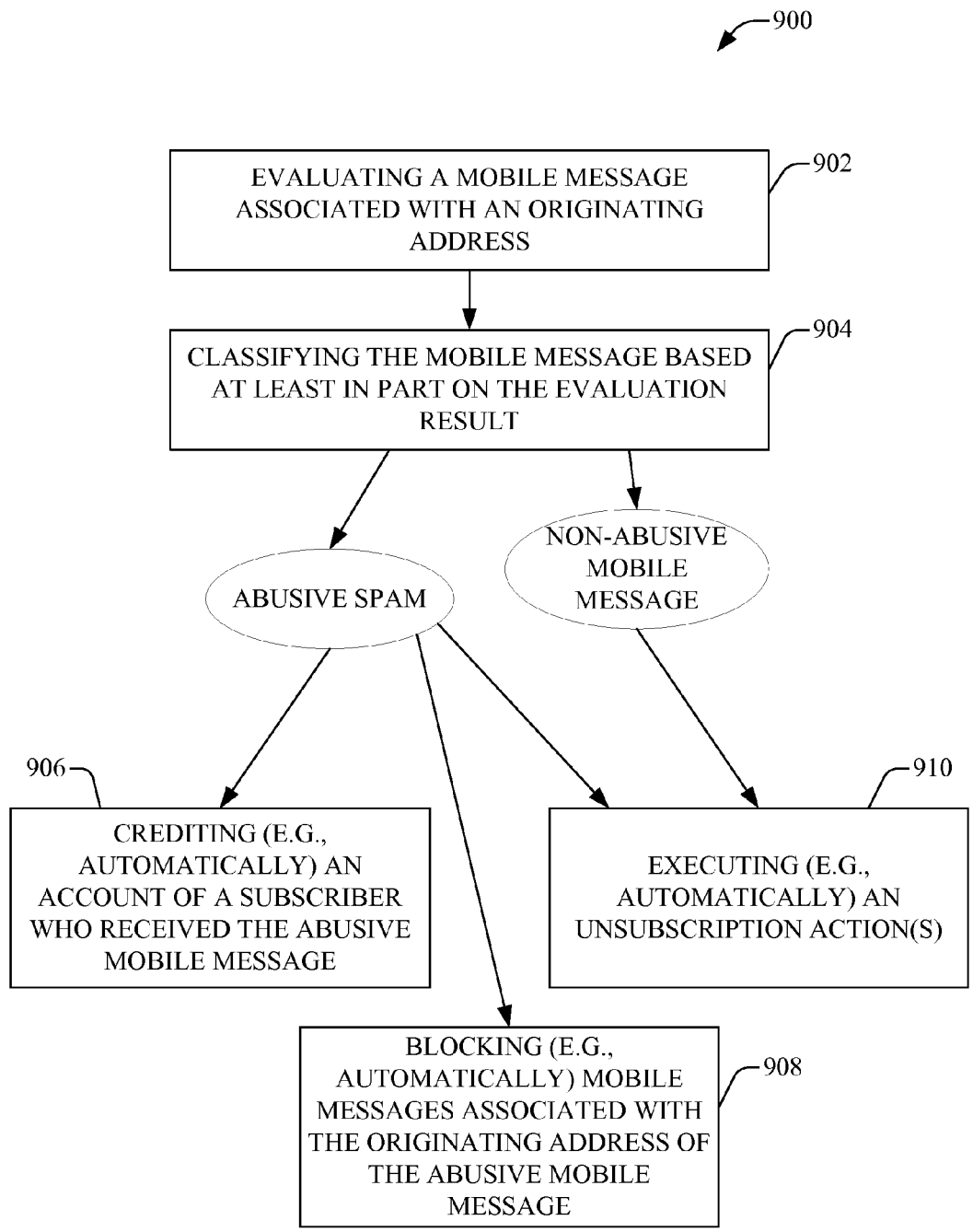
FIG. 9 illustrates a flowchart of an example methodology that can intelligently select and execute a desired abuse management action(s) in response to identifying or classifying a mobile message reported as abusive in an abuse report from a subscriber in accordance with an aspect of the disclosed subject matter.

In accordance with another embodiment, alternatively or additionally, a count of hash values associated with a mobile message under evaluation that meet or exceed an applicable predefined threshold abuse-report-hash ratio value (e.g., a first predefined threshold abuse-report-hash ratio value) can be maintained and tracked, wherein the methodology can continue to evaluate hash values associated with the mobile message after a particular hash value has been identified as being at or over the applicable predefined threshold abuse-report-hash ratio value (e.g., indicative of an abusive spam mobile message), and, if the number of hash values, which are at or above the applicable predefined threshold abuse-report-hash ratio value, reaches a predefined threshold number of hash values, the mobile message can be classified as an abusive spam mobile message FIG. 9 presents a flowchart of an example methodology 900 that can intelligently select and execute a desired abuse management action(s) in response to identifying or classifying a mobile message reported as abusive in an abuse report from a subscriber in accordance with an aspect of the disclosed subject matter. At 902, a mobile message associated with an originating address can be evaluated, for example, in response to an abuse report that claims the mobile message is abusive. In an aspect, a UE can receive the mobile message, and, if the user believes that the mobile message is abusive, for instance, spam, the UE user can initiate, generate, and send an abuse report to the core network (e.g., MADC associated therewith) to report the mobile message as an abusive mobile message. In response to the received abuse report, the MADC can evaluate the mobile message to identify whether the mobile message is abusive and/or what type of mobile message it is. In accordance with various aspects, the MADC can evaluate the mobile message and/or other mobile messages deemed relevant (e.g., mobile messages from the same originating address as the reported mobile message, mobile messages containing one or more same hashes as the reported mobile message, one or more mobile messages having same or similar content as the reported mobile message, etc.) to facilitate identifying whether the mobile message is abusive and/or classifying the type of mobile message it is, as more fully disclosed herein, and in accordance with the predefined message abuse criteria.

At 904, the mobile message can be classified based at least in part on the evaluation result. In an aspect, the MADC can classify the mobile message as being abusive or not abusive, and can further classify the type of mobile message it is (e.g., non-abusive mobile message that is related to a subscription service), as desired, in accordance with the predefined message abuse criteria (e.g., employing one or more predefined message abuse rules to the mobile message and/or other relevant information being evaluated).

If, at 904, the mobile message is classified as abusive spam, methodology 900 can proceed to one or more of acts 906, 908, or 910, wherein one or more desired abuse management actions can be intelligently selected and executed in response to the evaluation (e.g., intelligent evaluation) of the mobile message in which the mobile message was classified as abusive spam. At 906, as desired, the account associated with the subscriber who received the abusive mobile message can be credited (e.g., automatically) for costs incurred in association with receiving the abusive mobile message. For instance, when the mobile message is classified as an abusive mobile message, where the type of spam can be, for example, general spam, or a spam subscription-related or distribution-list related mobile message (e.g., illegitimate or disreputable subscription service provider or distributor). At 908, as desired, mobile messaging associated with the originating address that sent the abusive mobile message can be blocked or filtered from being sent to the user who reported the mobile message as abusive, or can be blocked or filtered as to all mobile messaging to other UEs. As desired, one or more other abuse management actions can be executed, wherein such actions can include, for example, shutdown of the SIM card associated with the originating address, shutdown of the service to the UE associated with the originating address, etc.

At 910, as desired, a desired unsubscription action can be executed (e.g., automatically). For instance, if the abusive mobile message is further classified as being related to a subscription service or distribution list (e.g., illegitimate or disreputable subscription service provider or distributor), the MADC can execute one or more desired unsubscription actions, which can include, for example, acting on behalf of the complaining UE user to request that the UE user be unsubscribed from the subscription service or removed from the distribution list; notifying the complaining UE user that the mobile message is related to a subscription service or distribution list for which the UE user has subscribed or joined, or it at least appears the UE user has subscribed or joined, and recommending that the complaining UE user act to unsubscribe from the subscription service or distribution list, if the UE user so desires; and/or can recommend to the subscription service provider or distributor that the complaining UE user be unsubscribed from the subscription service or removed from the distribution list.

Referring again to act 904, if, at 904, the mobile message is classified as not being an abusive spam mobile message, and is further classified as not being related to a subscription service or distribution list, at 912, it can be determined (e.g., automatically) that no credit be given to the account of the complaining UE user with regard to the mobile message, no block or filter is to be placed on the originating address that sent the mobile message to the UE of the complaining UE user, and/or no unsubscription action is to be executed in response to the abuse report from the complaining UE user. If, at 904, the mobile message is classified as not being an abusive spam mobile message, and is further classified as being related to a subscription service or distribution list, at 910, a desired unsubscription action(s) can be executed (e.g., automatically), in accordance with the predefined message abuse criteria. It can further be determined that no credit is to be given to the account of the complaining UE user, and no block or filter is to be placed on the originating address that sent the mobile message to the UE of the complaining UE user.

Figure 10:
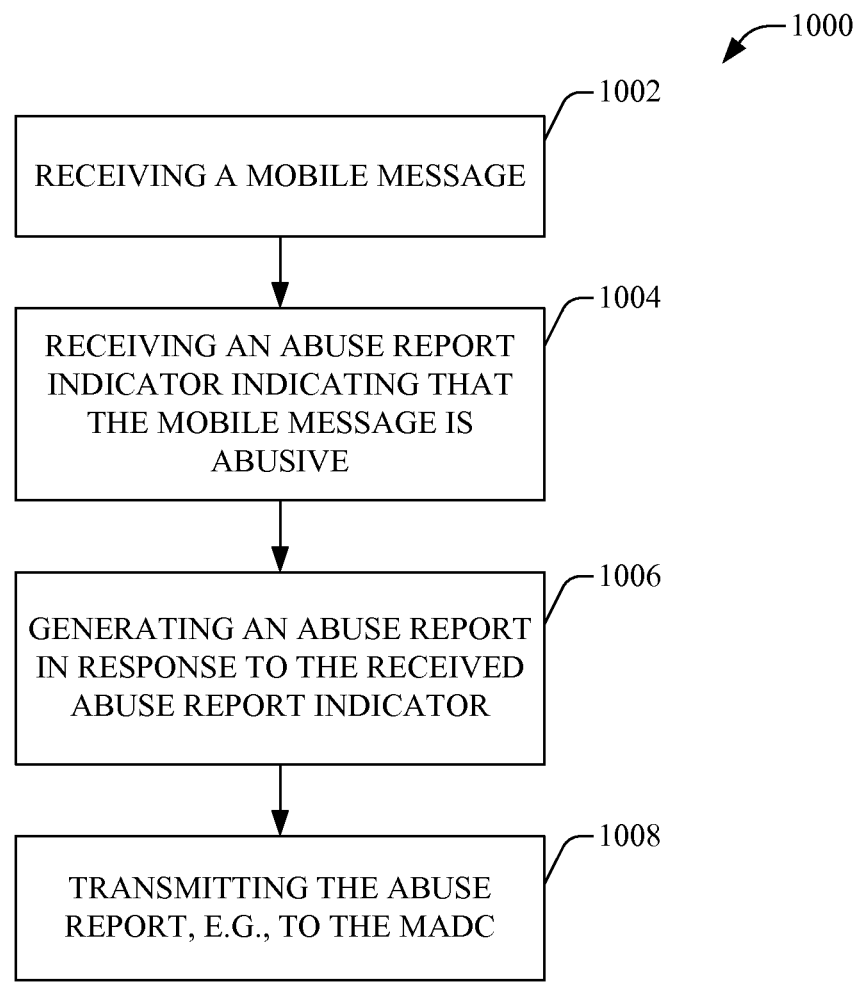
FIG. 10 depicts a flowchart of an example methodology for reporting abusive, or suspected abusive, mobile messages in accordance with an aspect of the disclosed subject matter.

FIG. 10 depicts a flowchart of an example methodology 1000 for reporting abusive, or suspected abusive, mobile messages in accordance with an aspect of the disclosed subject matter. At 1002, a mobile message can be received, for example, by a UE. In an aspect, a mobile message can be received by the UE from a sending UE associated with an originating address. At 1004, an abuse report indicator can be received, wherein the abuse report indicator can indicate that the mobile message is abusive (at least as defined by the UE user) and an abuse report is desired. For instance, the UE can present the mobile message to the user, and, if desired, can present an interface that can provide the UE user a control, button, or menu that can be used to indicate that the mobile message is abusive, via selection of the abuse report indicator, when the UE user determines the mobile message to be abusive (e.g., and abusive message button or spam button can be provided to the user, which the user can press or select to indicate that the mobile message is considered abusive by the user). In an embodiment, as desired, additional information can be received from the user to include in the abuse report, wherein the interface can provide a region for the user to enter the additional information and/or a menu with predefined information or reasons for indicating the message is abusive can be provided to the user for selection by the user to be included in the abuse report.

At 1006, an abuse report can be initiated and/or generated in response to the received abuse report indicator. In an aspect, the mobile device can initiate or generate an abuse report in response to the abuse report indicator. At 1008, the abuse report can be transmitted, for example, to the MADC for further processing.

Figure 11:
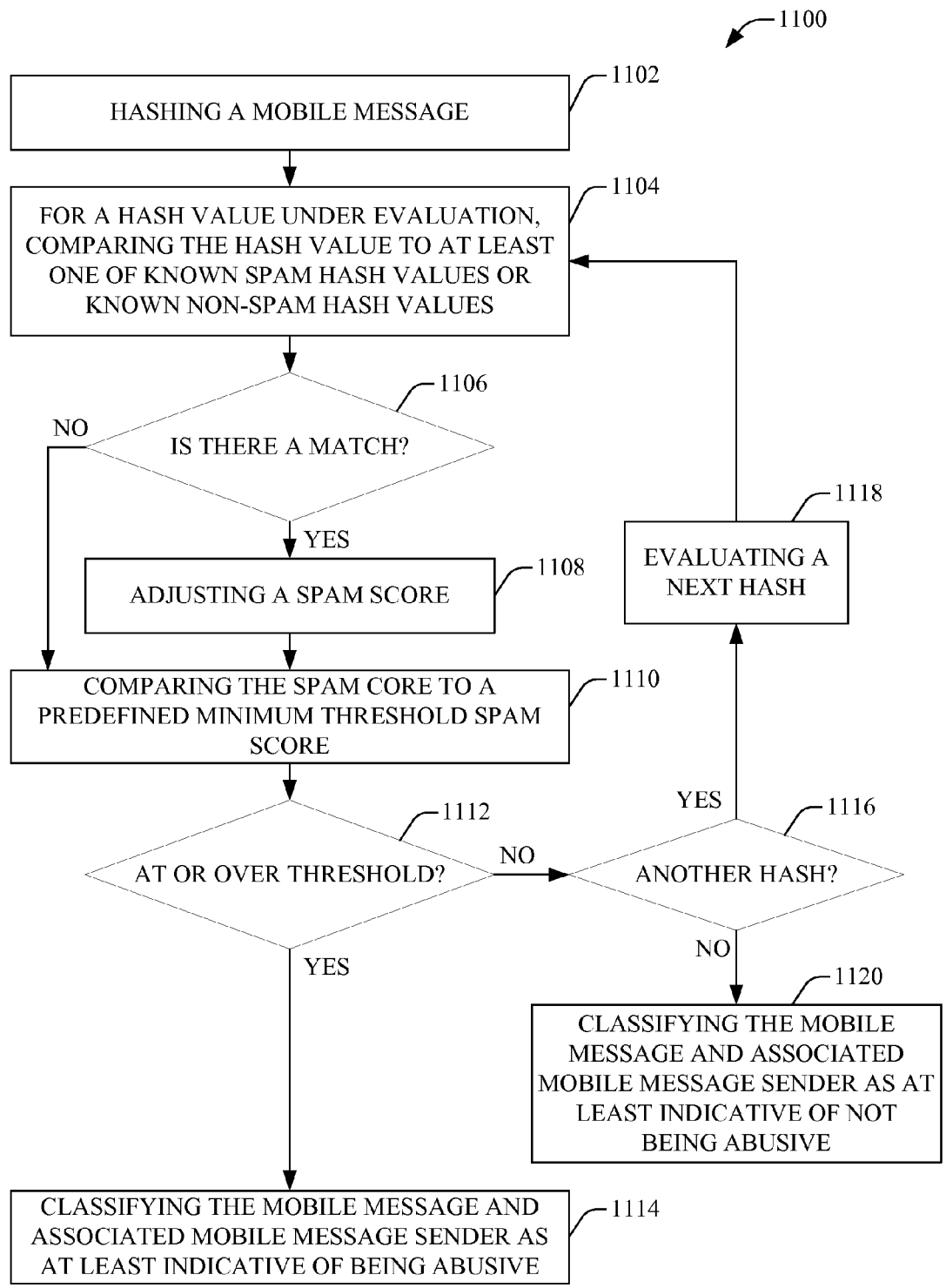
FIG. 11 depicts a flowchart of an example methodology that can evaluate a reported mobile message to determine whether there is a correlation of mobile message content to known spam content or non-spam content in accordance with an aspect of the disclosed subject matter.

FIG. 11 presents a flowchart of an example methodology 1100 that can evaluate a reported mobile message to determine whether there is a correlation of mobile message content to known spam content or known non-spam content in accordance with an aspect of the disclosed subject matter. At 1102, a mobile message can be hashed to obtain (e.g., generate) one or more hash values relating to (e.g., representative of) content of the mobile message. In an aspect, a UE can receive the mobile message from a mobile message sender associated with an originating address, which can be associated with a UE of the mobile message sender. If the received mobile message is deemed abusive (e.g., spam) by the UE user, the UE user (e.g., via the user's UE) can initiate, generate, and send an abuse report identifying the received mobile message as an abusive mobile message, wherein the MADC can receive the abuse report.

In response, the MADC can evaluate the information in the abuse report and/or other relevant information to facilitate classifying the mobile message as abusive or not and/or classifying the type of mobile message (e.g., subscription-related mobile message) it is, in accordance with the predefined message abuse criteria. In an aspect, the MADC can apply one or more desired hash techniques to the content of the mobile message to obtain one or more hash values, which can be representative of the mobile message content, or a portion thereof.

At 1104, for each desired hash value associated with the mobile message under evaluation, the hash value can be compared to at least one of known spam hash values or known non-spam hash values. In an aspect, the MADC can access known spam hash values and/or known non-spam hash values (e.g., "ham" hash values) from a data store, and can compare the hash value under evaluation with the known spam hash values and/or non-spam hash values to facilitate classifying the mobile message.

At 1106, a determination can be made regarding whether the hash value under evaluation is a match to a known spam hash value or a known non-spam hash value. If there is a match to a known spam hash value or a known non-spam hash value, at 1108, a spam score associated with the mobile message can be adjusted from a prior spam score associated with the mobile message under evaluation. In an aspect, respective known spam hash values can have respective scores or weights, wherein, for example, a higher spam score or weight can be assigned to a spam hash value that is identified as being more indicative of spam than another spam hash value. Similarly, respective known non-spam hash values can have respective non-spam scores—which, for example, can be negative valued spam scores (e.g., a spam score that is a negative number or weight)—wherein a higher non-spam score (or alternatively a more negative spam score) can be assigned to a non-spam hash value that is more indicative of not being spam than another non-spam hash value (or a spam hash value). When there is a match to a known spam hash value or known non-spam hash value, the MADC can apply the corresponding spam score or weighting to the previous spam score, which, for example, can initially be set to zero, to increase the spam score when the current hash value under evaluation matches a particular known spam hash value, or decrease the spam score when the current hash value matches a particular known non-spam hash value. At this point, from act 1108, methodology can proceed to act 1110. If, at 1106, it is determined that there is no match to a known spam hash value or a known non-spam hash value, the spam score can remain at the previous spam score without adjustment, and methodology 1100 can proceed to act 1110.

It should be noted that, in accordance with various embodiments, as desired, with regard to methodology 1100, the amount of decrease in the spam score for a match to a known non-spam hash value can be desirably less than an increase in the spam score for a match to a known spam hash value, to reduce the risk that a spam message sender will insert a significant amount of non-spam content in a spam mobile message (e.g., at the end of the spam mobile message) in an effort to improperly affect the spam score and drive the spam score downward so that the mobile message is not classified as spam, when, in fact, the mobile message is spam. Alternatively, instead of adjusting the spam score downward when the hash value under evaluation is a match to a known non-spam hash value, it can be desirable to not adjust the spam score, as a spam message sender may learn of this and insert a significant amount of non-spam content in a spam mobile message in an effort to improperly affect the spam score and drive it downward so that the mobile message is not classified as spam, when, in fact, the mobile message is spam.

At 1110, the spam score under evaluation (e.g., spam score associated with the mobile message), as adjusted at act 1108, or as previously scored when no spam score adjustment is made after act 1106, can be compared to a predefined minimum threshold spam score, wherein a spam score at or above the predefined minimum threshold spam score can at least be indicative of the mobile message being spam. At 1112, a determination can be made regarding whether the spam score under evaluation is at or above the predefined minimum threshold spam score.

If it is determined that the spam score under evaluation is at or above the predefined minimum threshold spam score, at 1114, the mobile message can be classified as being an abusive spam mobile message or at least as being indicative of an abusive spam mobile message and the mobile message sender can be classified as an abusive message sender or at least as indicative of being an abusive mobile message sender. In accordance with the predefined message abuse rules, one or more desired abuse management actions can be executed, for example, by the MADC in response to classifying the mobile message as an abusive spam mobile message, as more fully disclosed herein; or, when the mobile message is classified as being indicative of an abusive spam mobile message, further evaluation associated with the mobile message can be performed (e.g., further evaluation can be performed with regard to the mobile message and/or associated originating address and/or the address from which the abuse report was received) and/or the mobile messaging associated with the originating address can be sidelined for a desired amount of time while the investigation/evaluation of mobile messaging associated with that originating address is performed, as more fully disclosed herein, in accordance with the predefined message abuse criteria.

If, at 1112, the spam score under evaluation is below the predefined minimum threshold spam score, methodology 1100 can proceed to act 1116, and, at 1116, a determination can be made regarding whether there is another hash value to be evaluated in relation to the mobile message associated with the abuse report. If it is determined that there is another hash value to evaluate, at 1118, a next hash value associated with the mobile message can be evaluated, and from this point, methodology 1100 can proceed to act 1104, wherein the next hash value can be evaluated, in part, by comparing this hash value to at least one of known spam hash values or known non-spam hash values, and methodology 1100 can proceed from that point.

If, at 1116, it is determined that there is no other hash value to be evaluated in relation to the mobile message, at 1120, the mobile message can be classified as not being an abusive spam mobile message or at least as being indicative of not being an abusive spam mobile message, in accordance with the predefined mobile message criteria. In an aspect, the MADC can execute a desired abuse management action(s) in response to the classification determined in act 1120.

Figure 12:
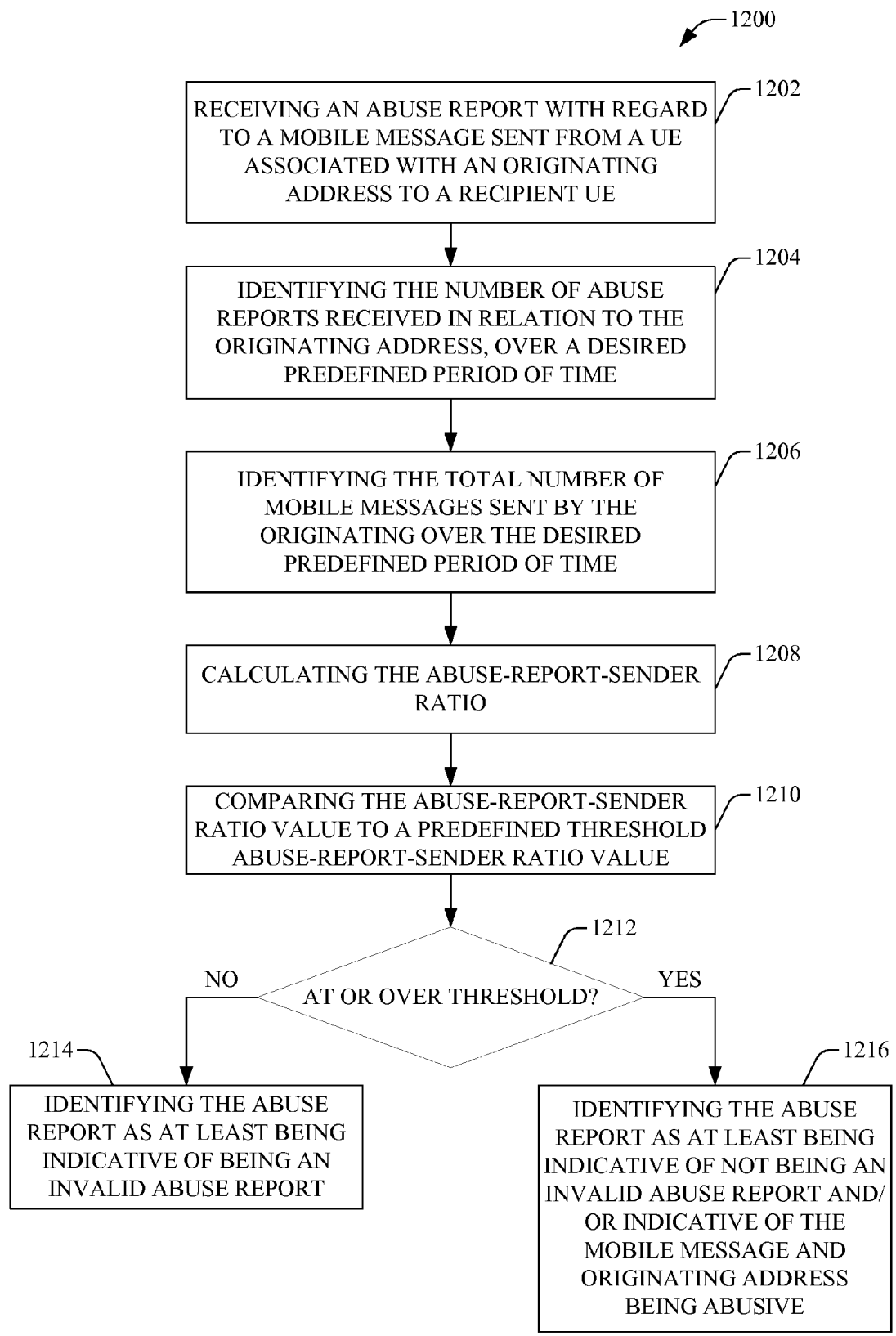
FIG. 12 illustrates a flowchart of an example methodology that can evaluate an abuse-report-sender ratio to facilitate classifying a reported mobile message in accordance with an aspect of the disclosed subject matter.

FIG. 12 illustrates a flowchart of an example methodology 1200 that can evaluate an abuse-report-sender ratio to facilitate classifying a reported mobile message in accordance with an aspect of the disclosed subject matter. At 1202, an abuse report can be received with regard to a mobile message sent from a UE associated with an originating address to a recipient UE. In an aspect, the abuse report can include information relating to the mobile message, wherein the information can include, for example, an identification of the mobile message as being abusive, a reason(s) why the mobile message has been deemed abusive by the abuse report sender, the originating address, the termination address that received the mobile message, content of the mobile message, time the mobile message was sent, and/or other desired information.

At 1204, the number of abuse reports received in relation to the originating address (e.g., the number of abuse reports that identify a mobile message(s) received from the originating address as abusive) can be identified, for example, over a desired predefined period of time (e.g., one hour, one day, one week, one month, . . . ). At 1206, the total number of mobile messages sent by the originating address (e.g., from the address associated with the sender), for example, over the desired predefined period of time, can be identified. At 1208, the ratio of abuse reports associated with the originating address to the overall total number of mobile messages sent from the originating address can be calculated or determined to obtain an abuse-report-sender ratio value associated with the abuse report sender.

At 1210, the abuse-report-sender ratio value can be compared to a predefined threshold abuse-report-sender ratio value, wherein, for example, an abuse-report-sender ratio value that is below the predefined abuse-report-sender ratio value, or outside a predefined range of abuse-report-sender ratio values, can at least indicate that the abuse report relating to the mobile message under evaluation is not valid, and an abuse-report-sender ratio value that is at or above the predefined abuse-report-sender ratio value, or within the predefined range of abuse-report-sender ratio values, can at least be indicative of the originating address being an abusive mobile message sender. At 1212, a determination can be made as to whether the abuse-report-sender ratio value is at or above the predefined abuse-report-sender ratio value.

If it is determined that the abuse-report-sender ratio value is below the predefined abuse-report-sender ratio value (or outside a predefined range of abuse-report-sender ratio values), at 1214, the abuse report can be identified as at least being indicative of being an invalid abuse report. If, at 1212, it is determined that the abuse-report-sender ratio value is at or above the predefined abuse-report-sender ratio value (or within the predefined range of abuse-report-sender ratio values), at 1216, the mobile message can be identified as at least being indicative of being an abusive mobile message and the originating address as an abusive mobile message sender. In an aspect, the MADC can perform all or at least a desired portion of the acts of methodology 1200. In accordance with the predefined message abuse criteria, the MADC can use the identification of the abuse report as at least being indicative of being an invalid abuse report or the identification of the abuse report as at least being indicative of not being an invalid abuse report to facilitate classifying the mobile message.

Figure 13:
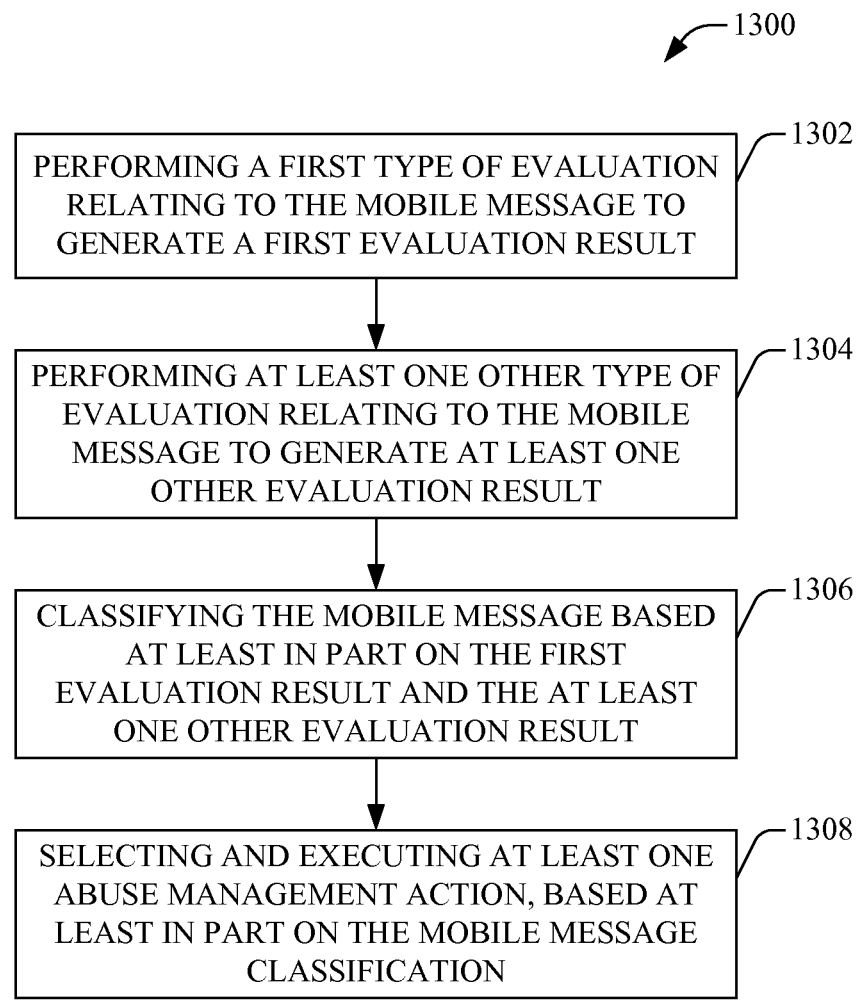
FIG. 13 depicts a flowchart of an example methodology for intelligently classifying a mobile message to facilitate intelligently selecting and executing a desired abuse management action(s) in accordance with an aspect of the disclosed subject matter.

FIG. 13 illustrates a flowchart of an example methodology 1300 for intelligently classifying a mobile message to facilitate intelligently selecting and executing a desired abuse management action(s) in accordance with an aspect of the disclosed subject matter. In an aspect, the methodology can be performed in response to an abuse report, which identifies a mobile message received by a user's UE as an abusive mobile message, wherein the abuse report can be received from the user's UE by the MADC. At 1302, a first type of evaluation relating to the mobile message can be performed to generate a first evaluation result. The first type of evaluation can be, for example, calculating and evaluating an abuse-report-hash ratio, calculating and evaluating an abuse-report-sender ratio, evaluating content correlation, evaluating the reputation of the mobile message sender, evaluating the reputation of the abuse report sender, calculating and evaluating a unique ID to overall-mobile-message ratio, evaluating to determine whether the originating address is a short code or long code, and/or performing other desired types of evaluations, as more fully disclosed herein.

At 1304, at least one other type of evaluation relating to the mobile message can be performed to generate at least one other evaluation result. In an aspect, the MADC can perform one or more other evaluations relating to the mobile message, wherein the one or more other evaluations can be a different type of evaluation than the evaluation performed at act 1302 and can be, for example, one or more of calculating and evaluating an abuse-report-hash ratio, calculating and evaluating an abuse-report-sender ratio, evaluating content correlation, evaluating the reputation of the mobile message sender, evaluating the reputation of the abuse report sender, calculating and evaluating a unique ID to overall-mobile-message ratio, counting the number of mobile messages sent from the originating address over a predefined period of time, evaluating to determine whether the originating address is a short code or long code, and/or performing other desired types of evaluations, as more fully disclosed herein.

At 1306, the mobile message can be classified (e.g., intelligently and automatically) based at least in part on the first evaluation result and the at least one other evaluation result, in accordance with the predefined mobile message criteria. For example, if the first type of evaluation is calculating and evaluating the abuse-report-hash ratio, and the first evaluation result is that the mobile message is at least indicative of the mobile message not being an abusive spam mobile message, and the at least one other type of evaluation comprising evaluating to determine whether the originating address is a short code or long code, wherein the at least one other evaluation result, comprises the originating address being a short code, which can be thereby be indicative of the mobile message being related to a subscription service. Based at least in part on the evaluation results, the MADC can classify the mobile message as a non-abusive, subscription-related mobile message.

At 1308, at least one abuse management action can be selected and executed (e.g., intelligently and automatically), based at least in part on the mobile message classification. In an aspect, in response to identifying the mobile message as an abusive spam mobile message, the MADC can select and execute (e.g., automatically) one or more desired abuse management actions (e.g., automatic blocking of mobile messages associated with the originating address, automatic crediting of the account of the abuse report sender for the cost incurred in relation to receiving the mobile message, automatically executing an unsubscription action, etc.), based at least in part on the classification of the mobile message.

It is to be appreciated and understood that components (e.g., UE, AP, core network, MADC, etc.), as described with regard to a particular system or methodology, can include the same or similar functionality as respective components (e.g., respectively named components or similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store executable instructions; and
a processor, coupled to the memory, that facilitates execution of the executable instructions to perform operations, comprising:
facilitating communication of a mobile message from a first communication device to a second communication device via a communicator component of a communication network, wherein an originating address of the mobile message is associated with the first communication device;
evaluating information relating to the mobile message to facilitate determining a first evaluation result that facilitates determining whether the mobile message is an abusive message and a second evaluation result that facilitates determining whether the mobile message is associated with a subscription;

determining a result value based on a ratio, over a defined period of time, of a first number of distinct termination addresses in a second number of mobile messages sent from the originating address associated with the first communication device to the second number of mobile messages sent from the originating address to facilitate the determining of whether the mobile message is related to the subscription based on the second evaluation result that comprises the result value;

classifying whether the mobile message is the abusive message, based on the first evaluation result and the second evaluation result, in accordance with a defined message abuse criterion; and in response to determining that a ratio value of an abuse-report-hash-ratio result is within a defined range of ratio values, and in response to classifying the mobile message as being the abusive message based on the first evaluation result and the second evaluation result, filtering mobile messages associated with at least the originating address from which the mobile message was sent to facilitate blocking delivery of the mobile messages to a set of communication devices, comprising the second communication device.

2. The system of claim 1, wherein the operations further comprise hashing the mobile message to generate a first hash value that is representative of a first portion of content of the mobile message based on a defined hash technique and the defined message abuse criterion.

3. The system of claim 2, wherein the operations further comprise:
   determining an overall number of mobile messages, over the defined period of time, that are represented by the first hash value;
   determining a number of abuse-reported mobile messages, of the overall number of mobile messages, for which an abuse report has been received; and
   determining an abuse-report-hash ratio, based on another ratio of the number of abuse-reported mobile messages to the overall number of mobile messages, to generate the abuse-report-hash ratio result.

4. The system of claim 3, wherein the operations further comprise classifying whether the mobile message is an abusive spam mobile message, and whether the originating address associated with the first communication device is an abusive mobile message sender, based on the abuse-report-hash ratio result, wherein the abuse-report-hash ratio result being determined to comprise the ratio value that is within the defined range of ratio values that is indicative of the mobile message being the abusive spam mobile message and the originating address being the abusive mobile message sender.

5. The system of claim 4, wherein the filtering the mobile messages associated with at least the originating address from which the mobile message was sent the operations further comprise comprises filtering the mobile messages associated with the abusive mobile message sender to facilitate blocking the delivery of the mobile messages to the set of communication devices, comprising the second communication device, in response to determining that the ratio value is within the defined range of ratio values.

6. The system of claim 4, wherein the operations further comprise, in response to determining that the ratio value is not within the defined range ratio values,
   determining whether the result value satisfies a defined threshold value; and
   classifying the mobile message as being related to the subscription in response to the result value being determined to satisfy the defined threshold value.

7. The system of claim 2, wherein the operations further comprise:
   evaluating the first hash value and a known spam hash value;
   determining whether there is a correlation between the first hash value and the known spam hash value; and
   classifying the mobile message based on the determining whether there is the correlation between the first hash value and the known spam hash value.

8. The system of claim 1, wherein the operations further comprise:
   determining a number of abusive messages that are indicated to have been sent from the originating address associated with the first communication device, based on a set of abuse reports, wherein the set of abuse reports are received from a set of addresses associated with the set of communication devices over the defined period of time;
   determining a total number of mobile messages sent from the originating address associated with the first communication device;
   determining an abuse ratio based on another ratio of reported number of abusive messages sent from the originating address associated with the first communication device to the total number of mobile messages sent from the originating address associated with the first communication device to generate an abuse ratio result; and
   classifying whether the mobile message is the abusive message based on a comparison result of a comparison of a value of the abuse ratio result to a defined range of abuse ratio values.

9. The system of claim 1, wherein the operations further comprise executing an abuse management action in response to classifying the mobile message as being the abusive message.

10. The system of claim 9, wherein the executing the abuse management action comprises discontinuing a messaging service associated with the first communication device.

11. The system of claim 1, wherein the operations further comprise filtering a set of mobile messages associated with a termination address associated with the second communication device, based on a filter selected to be applied to the set of mobile messages sent to the termination address, to facilitate preventing delivery of a subset of the set of mobile messages to the second communication device.

12. A method, comprising:
   evaluating, by a system comprising a processor, information relating to a mobile message associated with an originating address associated with a first communication device to facilitate determining a first evaluation result that facilitates identifying whether the mobile message is an abusive message and determining a second evaluation result that facilitates identifying whether the mobile message is associated with a subscription, wherein the mobile message is associated with a destination address associated with a second communication device;
   determining, by the system, a result value, for a defined period of time, based on a ratio of a first number of distinct termination addresses in a second number of mobile messages sent from the originating address to the second number of mobile messages sent from the originating address to facilitate the identifying whether the mobile message is associated with the subscription based on the second evaluation result that comprises the result value;

classifying, by the system, whether the mobile message is the abusive message, based on the first evaluation result and the second evaluation result, in accordance with a defined message abuse criterion; and in response to determining that a ratio value of an abuse-report-hash-ratio result is within a defined range of ratio values, and in response to classifying the mobile message as being the abusive message based on the first evaluation result and the second evaluation result, filtering, by the system, mobile messages associated with at least the originating address from which the mobile message was sent to facilitate preventing delivery of the mobile messages to a set of communication devices, comprising the second communication device.

13. The method of claim 12, further comprising:

executing, by the system, an abuse management action in response to classifying the mobile message as being the abusive message, wherein abuse management action comprises crediting an account associated with the second communication device for a cost relating to the mobile message.

14. The method of claim 12, further comprising:

hashing, by the system, the mobile message; and generating, by the system, a hash value based on the hashing of the mobile message.

15. The method of claim 14, further comprising:

determining, by the system, an overall number of mobile messages, for the defined period of time, that are represented by the hash value, in response to an abuse report received from the second communication device;

determining, by the system, a number of abuse-reported mobile messages, from the overall number of mobile messages, that are identified as abusive in a set of abuse reports;

determining, by the system, another ratio of the number of abuse-reported mobile messages to the overall number of mobile messages; and generating, by the system, the abuse-report-hash ratio result based on the other ratio.

16. The method of claim 14, further comprising:

comparing, by the system, the hash value to known spam content; and classifying, by the system, whether the mobile message is the abusive message based on whether the hash value is a match to the known spam content.

17. The method of claim 14, further comprising:

receiving, by the system, an abuse report from the second communication device, wherein the abuse report indicates the mobile message is abusive;

classifying, by the system, the mobile message as being associated with the subscription based on the first evaluation result and the second evaluation result, wherein the second evaluation result indicates that the mobile message is associated with the subscription;

determining, by the system, that mobile messages associated with the subscription are not to be sent to the second communication device; and facilitating, by the system, unsubscribing the second communication device from the subscription in response to the classifying of the mobile message as being associated with the subscription and the determining that the mobile messages associated with the subscription are not to be sent to the second communication device.

18. The method of claim 12, further comprising:

receiving, by the system, an abuse report from the second communication device;

identifying, by the system, a reputation value associated with the second communication device;

applying, by the system, the reputation value to a value representative of the abuse report to facilitate weighting the value representative of the abuse report to facilitate generating a weighted value of the abuse report; and generating, by the system, the weighted value of the abuse report in response to the applying of the reputation value to the value representative of the abuse report, wherein the weighted value of the abuse report facilitates the classifying of the mobile message.

19. A non-transitory computer-readable storage medium storing computer-executable instructions that, in response to execution, cause a system comprising a processor to perform operations, comprising:

evaluating information relating to a mobile message associated with an originating address associated with a first communication device to facilitate determining a first evaluation result that facilitates identifying whether the mobile message is an abusive message and determining a second evaluation result that facilitates identifying whether the mobile message is associated with a subscription, wherein the mobile message is associated with a destination address associated with a second communication device;

over a defined period of time, determining a result value based on a ratio of a number of distinct termination addresses in another number of mobile messages sent from the originating address to the other number of mobile messages sent from the originating address to facilitate the identifying whether the mobile message is associated with the subscription based on the second evaluation result that comprises the result value;

determining whether the mobile message is the abusive message, based on the first evaluation result and the second evaluation result, in accordance with a defined message abuse criterion; and in response to determining that a ratio value of an abuse-report-hash-ratio result is within a defined range of ratio values, and in response to determining that the mobile message is the abusive message based on the first evaluation result and the second evaluation result, filtering mobile messages associated with at least the originating address from which the mobile message was sent to facilitate blocking delivery of the mobile messages to a set of communication devices, comprising the second communication device.

20. The non-transitory computer-readable storage medium of claim 19, wherein the operations further comprise:

hashing the mobile message;

generating a hash value based on the hashing of the mobile message;

comparing the hash value to a spam hash value associated with known spam content; and classifying whether the mobile message is the abusive message based on whether the hash value is a match to the spam hash value.

* * * * *